US012168355B2

(12) United States Patent
Seguchi

(10) Patent No.: US 12,168,355 B2
(45) Date of Patent: Dec. 17, 2024

(54) RECORDING METHOD AND RECORDING APPARATUS

(71) Applicant: Seiko Epson Corporation, Tokyo (JP)

(72) Inventor: Kenichi Seguchi, Okaya (JP)

(73) Assignee: SEIKO EPSON CORPORATION (JP)

( * ) Notice: Subject to any disclaimer, the term of this patent is extended or adjusted under 35 U.S.C. 154(b) by 190 days.

(21) Appl. No.: 17/562,072

(22) Filed: Dec. 27, 2021

(65) Prior Publication Data

US 2022/0203699 A1 Jun. 30, 2022

(30) Foreign Application Priority Data

Dec. 28, 2020 (JP) ................................ 2020-219289

(51) Int. Cl.
*B41J 2/21* (2006.01)

(52) U.S. Cl.
CPC .................................. *B41J 2/2114* (2013.01)

(58) Field of Classification Search
CPC .............................. B41J 2/2114; B41J 2/2117
See application file for complete search history.

(56) References Cited

U.S. PATENT DOCUMENTS

2001/0020964 A1 9/2001 Irihara et al.
2008/0182083 A1 7/2008 Oyanagi et al.
2008/0213518 A1 9/2008 Oyanagi et al.
2009/0308279 A1 12/2009 Koganehira et al.
2010/0143593 A1 6/2010 Sano
2013/0088539 A1 4/2013 Usuda
2013/0108842 A1 5/2013 Shiono et al.
2013/0278660 A1* 10/2013 Tsuji ...................... B41J 2/2132
347/14
2014/0078218 A1 3/2014 Ozawa
2015/0115202 A1 4/2015 Kagata
(Continued)

FOREIGN PATENT DOCUMENTS

CN 110194005 A 9/2019
CN 110949030 A 4/2020
(Continued)

*Primary Examiner* — Scott A Richmond
(74) *Attorney, Agent, or Firm* — Harness, Dickey & Pierce, P.L.C.

(57) ABSTRACT

A recording method according to the present disclosure is a recording method that performs recording on a recording medium, the recording method including a white ink adhesion step of adhering a white ink composition containing a white color material to the recording medium and a non-white ink adhesion step of adhering a non-white ink composition containing a non-white color material to the recording medium, in which the white ink adhesion step and the non-white ink adhesion step are performed by relative scanning between a recording head and the recording medium, the white ink adhesion step and the non-white ink adhesion step are performed by the same relative scanning on the same scanning region of the recording medium, and in the recording region to which the white ink composition and the non-white ink composition are adhered, an adhesion amount of the white ink composition is 60% by mass or less with respect to 100% by mass of an adhesion amount of the non-white ink composition per unit region.

15 Claims, 6 Drawing Sheets

(56) References Cited

U.S. PATENT DOCUMENTS

| | | | | |
|---|---|---|---|---|
| 2016/0083603 | A1 | 3/2016 | Okuda | |
| 2019/0061382 | A1* | 2/2019 | Okuda | B41J 2/2107 |
| 2019/0264056 | A1 | 8/2019 | Okuda et al. | |
| 2019/0283464 | A1 | 9/2019 | Matsuzaki | |
| 2019/0366714 | A1 | 12/2019 | Tsukahara et al. | |
| 2019/0366717 | A1 | 12/2019 | Tsukahara et al. | |
| 2020/0101758 | A1* | 4/2020 | Okuda | C09D 11/322 |
| 2020/0101781 | A1 | 4/2020 | Okuda et al. | |

FOREIGN PATENT DOCUMENTS

| | | | |
|---|---|---|---|
| JP | 2005-153314 | A | 6/2005 |
| JP | 2005-262553 | A | 9/2005 |
| JP | 2009-286998 | A | 12/2009 |
| JP | 2010-158884 | A | 7/2010 |
| JP | 2016-060168 | A | 4/2016 |
| JP | 2016-175988 | A | 10/2016 |
| JP | 2018-103601 | A | 7/2018 |
| JP | 2018-111233 | A | 7/2018 |
| JP | 2019-156995 | A | 9/2019 |
| JP | 2020-049919 | A | 4/2020 |

* cited by examiner

RECORDING METHOD AND RECORDING APPARATUS

The present application is based on, and claims priority from JP Application Serial Number 2020-219289, filed Dec. 28, 2020, the disclosure of which is hereby incorporated by reference herein in its entirety.

BACKGROUND

1. Technical Field

The present disclosure relates to a recording method and a recording apparatus.

2. Related Art

In recent years, it has been studied to record, or print a product label and the like on a flexible packaging film such as a PET film. In addition, the flexible packaging film has a use of packaging foods and the like, and in such a use, a surface to be recorded on of the flexible packaging film is made of a plastic material such as polyolefin, nylon, and polyester, for example, and a transparent or semi-transparent material is used in many cases so that the content can be checked.

In addition, in recent years, in so-called sign graphics such as advertising signboards, window graphics, and car wrapping, production uses by printing are expanding. Various materials are used as recording media for sign graphics. Examples of the materials include banners, coated paper, matte paper, wallpaper, cloth, and plastic films such as PET/PVC. Among these, the form of advertising signboards that are printed on transparent/semi-transparent plastic films and attached to windows and the like is rapidly expanding recently.

In addition, label printing is also performed, and as this, printing on a transparent/semi-transparent plastic film is performed. In addition, in textile printing, recording on a non-transparent and non-white cloth is performed. In such various printing, printing on a transparent recording medium or a non-transparent and non-white recording medium is performed.

In various printing such as these, when printing is performed on a transparent medium, or when recording is performed on a non-transparent and non-white medium is performed, in order to record an image excellent in visibility, a predetermined image is formed with a color ink composition on a layer formed of a white color ink, which is referred to as a base layer that conceals a background, in some cases.

For example, JP-A-2010-158884 describes an image recording method of recording, with a white ink composition, a base layer, which is a white ink layer on a recording medium, and recording, with a color ink composition, a color image layer, which is a color ink layer on the base layer.

However, the recording method due to a laminating method in which the white ink layer is used as the background image of the color ink layer can record an image excellent in visibility, which is an image excellent in image quality, but goes through a step of laminating each ink layer. Accordingly, there was a problem in that a printing speed became slow. Therefore, it is required to achieve both recording of an image excellent in image quality and an excellent printing speed.

SUMMARY

An aspect of a recording method according to the present disclosure is a recording method of performing recording on a recording medium, the recording method including a white ink adhesion step of adhering a white ink composition containing a white color material to the recording medium, and a non-white ink adhesion step of adhering a non-white ink composition containing a non-white color material to the recording medium, in which the white ink adhesion step and the non-white ink adhesion step are performed by relative scanning between a recording head and the recording medium, the white ink adhesion step and the non-white ink adhesion step are performed by the relative scanning that is same as each other on a same scanning region of the recording medium, and in the recording region to which the white ink composition and the non-white ink composition are adhered, an adhesion amount of the white ink composition is 60% by mass or less with respect to 100% by mass of an adhesion amount of the non-white ink composition per unit region.

An aspect of the recording apparatus according to the present disclosure is a recording apparatus that performs recording on a recording medium, including a white ink head that adheres a white ink composition containing a white color material to the recording medium, a non-white ink head that adheres a non-white ink composition containing a non-white color material to the recording medium, and a scanning mechanism that performs relative scanning between an ink head and the recording medium, in which recording is performed by the recording method of the aspect.

DESCRIPTION OF EXEMPLARY EMBODIMENTS

Figure 1:
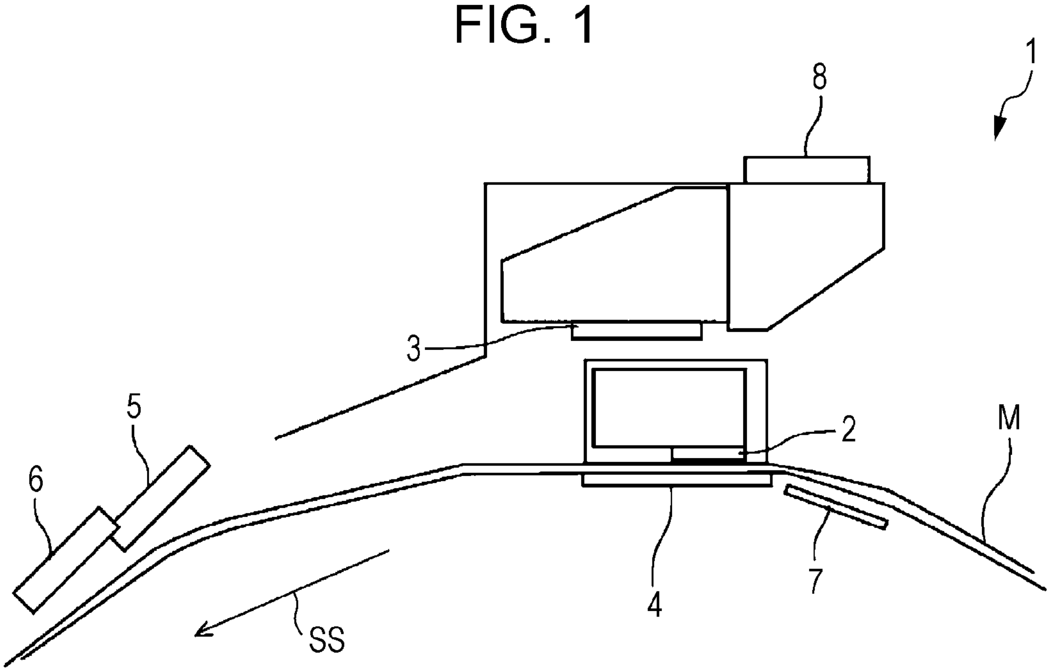
FIG. 1 is a schematic view of an example of a recording apparatus used in a recording method according to an embodiment.

Hereinafter, embodiments of the present disclosure will be described. The embodiments described below describe examples of the present disclosure. The present disclosure is not limited to the following embodiments, and includes various modifications implemented within a range not changing a gist of the present disclosure. It should be noted that not all of the configurations described below are essential configurations of the present disclosure.

1. RECORDING METHOD

A recording method according to an embodiment of the present disclosure is a recording method for performing recording on a recording medium, the method including a white ink adhesion step of adhering a white ink composition containing a white color material to the recording medium, and a non-white ink adhesion step of adhering a non-white ink composition containing a non-white color material to the recording medium, in which the white ink adhesion step and the non-white ink adhesion step are performed by relative scanning between a recording head and the recording medium, the white ink adhesion step and the non-white ink adhesion step are performed on a same scanning region of the recording medium by the relative scanning that is same as each other, and in a recording region to which the white ink composition and the non-white ink composition are adhered, an adhesion amount of the white ink composition is 60% by mass or less with respect to 100% by mass of the adhesion amount of the non-white ink composition per unit region.

That is, the recording method according to the present embodiment is a method in which a white ink composition and a non-white ink composition are adhered to the same scanning region by the same relative scanning on the recording medium by a recording head, and an adhesion amount of the white ink composition with respect to an adhesion amount of the non-white ink composition is defined.

When the white ink composition and the non-white ink composition are adhered to the same scanning region on the recording medium by a recording head by the same relative scanning, a step of laminating each ink layer is not passed through, the method is advantageous in terms of printing speed. However, in such a recording method, the white ink composition and the non-white ink composition are mixed with each other on the recording medium to produce a whitish image in some cases. In addition, when printing directly on a colored or transparent medium, it is generally assumed that the background is concealed, that is, a base layer is formed with white ink as a method of improving visibility. Therefore, in the related art, an idea of adhering both ink compositions to the same scanning region on the recording medium by the same relative scanning has not been reached, and a configuration of laminating each ink layer in the recording head was included. On the other hand, the recording method according to the present embodiment is a method in which even when both ink compositions are adhered to the same scanning region on the recording medium by the recording head by the same relative scanning, it is newly found that an image having good color developability, excellent in visibility, and excellent in image quality can be formed. It is presumed that this is because high shielding properties of an ink layer can be obtained due to white color material when maintaining excellent image quality by adhering a white ink composition and a non-white ink composition at a specific adhesion amount ratio. Therefore, according to the recording method according to the present embodiment, both excellent image quality and excellent printing speed can be achieved.

Hereinafter, regarding the recording method according to the present embodiment, a recording medium will be described first, and then each step will be described.

1.1. Recording Medium

A recording medium on which an image is formed by a recording apparatus according to the present embodiment may have a recording surface that absorbs a liquid such as ink, or may not have a recording surface that absorbs a liquid. Therefore, the recording medium is not particularly limited, and examples thereof include an absorption recording medium such as paper, an ink-absorbent film, and a cloth; a low-absorption recording medium such as printing paper; a non-absorption recording medium such as metal, glass, and polymer, and the like.

The excellent effect of the recording method of the present embodiment becomes more remarkable when an image is recorded on a low-absorption recording medium or a non-absorption recording medium, and thus is preferable.

The low-absorption recording medium or non-absorption recording medium refers to a recording medium having a property of not absorbing a liquid such as ink at all or almost not absorbing a liquid. Quantitatively, the low-absorption recording medium or non-absorption recording medium refers to "a recording medium in which a water absorption amount from the start of contact to 30 $msec^{1/2}$ in the Bristow method is 10 $mL/m^2$ or less". The Bristow method is the most popular method as a method of measuring a liquid absorption amount in a short time, and is also adopted by the Japan Technical Association of the Pulp and Paper Industry (JAPAN TAPPI). Details of a test method are described in "Paper and Paperboard-Liquid-Absorbent Test Method-Bristow Method" of Standard No. 51 of "JAPAN TAPPI Paper and Pulp Test Method 2000 Edition". On the other hand, the liquid-absorbent recording medium indicates a recording medium that does not correspond to a low-absorption recording medium and a non-absorption recording medium.

Examples of the non-absorption recording medium include those in which plastic is coated on a substrate such as paper, those in which a plastic film is adhered on a substrate such as paper, a plastic film not including an absorption layer, or a reception layer, and the like. Examples of the plastic referred to here include polyvinyl chloride, polyethylene terephthalate, polycarbonate, polystyrene, polyurethane, polyethylene, polypropylene, and the like.

In addition, examples of a low-absorption recording medium include a recording medium provided with a coating layer, or a reception layer for receiving a liquid such as ink on a surface, examples of the paper as a substrate include printing paper such as art paper, coated paper, and matte paper, and when the substrate is a plastic film, examples thereof include those in which a hydrophilic polymer and the like are coated on a surface such as polyvinyl chloride, polyethylene terephthalate, polycarbonate, polystyrene, polyurethane, polyethylene, and polypropylene, those in which particles such as silica and titanium are coated together with a binder, and the like.

The recording medium may be a non-white recording medium such as colorless transparent, semi-transparent, colored transparent, or chromatic opaque recording medium, or may be a white recording medium such as achromatic opaque. The non-white recording medium is a recording medium having a color other than white or a recording medium having transparency, which is semi-transparent or transparent. Colors other than white include, but are not limited to, black, brown, and the like.

Even with such a recording medium, in the recording method according to the present embodiment, recording that achieves both excellent image quality and excellent printing speed can be performed. Therefore, in the recording method according to the present embodiment, a non-white recording medium can be preferably used as the recording medium.

In addition, when the recording medium is colorless and transparent, a recorded object recorded by the recording method according to the present embodiment has the same advantage that an image is viewed similar to when viewed from a side where an image of the recording medium is formed and when viewed from an opposite side thereto. For example, when a recorded object is used by being attached to a window, the image quality is excellent both when viewed from the outside and viewed from the inside of the window.

1.2. White Ink Adhesion Step

The recording method according to the present embodiment includes a white ink adhesion step of adhering a white ink composition containing a white color material to a recording medium.

1.2.1. White Ink Composition

The white ink composition used in the recording method according to the present embodiment contains a white color material. Hereinafter, each component contained in the white ink composition will be described.

1.2.1.1. White Color Material

Examples of the white color material include metal compounds such as metal oxides, barium sulfate, and calcium carbonate. Examples of the metal oxide include titanium dioxide, zinc oxide, silica, alumina, magnesium oxide, and the like. In addition, particles having a hollow structure may be used as the white color material, and known particles can be used.

As the white color material, titanium dioxide is preferably used from a viewpoint of good whiteness and abrasion resistance among those as exemplified above. The white color material may be used alone, or may be used in combination of two or more.

A volume-based average particle size (D50), which is also referred to as "volume average particle size", of the white color material is preferably 30.0 nm or more and 600.0 nm or less, more preferably 100.0 nm or more and 500.0 nm or less, and further more preferably 150.0 nm or more and 400.0 nm or less. When the volume average particle size of the white color material is within the above range, the particles are less likely to settle, the dispersion stability can be improved, and the nozzle is less likely to be clogged when applied to a recording apparatus. In addition, when the volume average particle size of the white color material is within the above range, the color density such as whiteness can be sufficiently satisfied.

The volume average particle size of the white color material can be measured by a particle size distribution measuring device having laser diffraction scattering method as a measurement principle. Examples of the particle size distribution measuring device include a particle size distribution meter (for example, "Microtrack UPA" manufactured by Nikkiso Co., Ltd.) having a dynamic light scattering method as the measurement principle.

In the present specification, the term "white" when referring to a white ink composition, a white color material, and the like does not mean only completely white, but as long as the color is in a range of being visually recognized as white, the white includes color that is colored with chromatic color or achromatic color, or color having glossiness. In addition, examples of the white ink composition include those that are named and sold under a name that suggests that the ink is a white ink. More quantitatively, "white" includes not only a color having an L* of 100 but also a color having an L* of 80 or more and 100 or less, and also a color having each of a* and b* of ±10 or less, in CIELAB, for example. More preferably, it is a color having each of a* and b* of ±5 or less. More specifically, a value when the color ink is adhered to a transparent recording medium in a sufficient adhesion amount and the adhesion region is measured with a colorimeter compliant with CIELAB in a reflection mode is in the above range. A sufficient adhesion amount is 15 $mg/inch^2$, for example, in a case of a white ink composition. In addition, a color material that allows the ink to serve as such a white ink composition is used as a white color material.

A content, which is a solid content, of the white color material in the white ink composition is 5% by mass or more and 20% by mass or less, preferably 7% by mass or more and 20% by mass or less, more preferably 9% by mass or more and 15% by mass or less, and further more preferably 9% by mass or more and 13% by mass or less, with respect to a total mass of the white ink composition. When the content of the white color material is within the range, clogging of the nozzles of the recording apparatus is unlikely to occur, and an image more excellent in color developability and more excellent in image quality can be formed in some cases because the shielding properties of the ink layer are improved.

1.2.1.2. Dispersant

It is preferable that the white color material can be stably dispersed in water, and therefore, may be dispersed by using a dispersant. The dispersant may be any of a surfactant, a resin dispersant, and the like, and is selected from those configured to improve the dispersion stability of the white color material in the white ink composition containing the above white color material. In addition, the white color material may be used as a self-dispersion type white color material by oxidizing or sulfonating a surface of the white color material with ozone, hypochlorous acid, and fuming sulfuric acid to modify the surface of the white color material.

Examples of the resin dispersant include water-soluble resins such as (meth)acrylic resin such as poly(meth)acrylic acid, (meth)acrylic acid-acrylic nitrile copolymer, (meth) acrylic acid-(meth)acrylic acid ester copolymer, vinyl acetate-(meth)acrylic acid ester copolymer, vinyl acetate-(meth)acrylic acid copolymer, vinyl naphthalene-(meth) acrylic acid copolymer and salts thereof; styrene-based resins such as styrene-(meth)acrylic acid copolymer, styrene-(meth)acrylic acid-(meth)acrylic acid ester copolymer, styrene-α-methyl styrene-(meth)acrylic acid copolymer, styrene-α-methyl styrene-(meth)acrylic acid-(meth)acrylic acid ester copolymer, styrene-maleic acid copolymer, styrene-maleic anhydride copolymer and salts thereof; polymer compound (resin) containing a urethane bond in which an isocyanate group and a hydroxyl group are reacted, which may be linear and/or branched, urethane-based resin regardless of the presence or absence of a crosslinked structure and salts thereof; polyvinyl alcohols; vinyl naphthalene-maleic acid copolymers and salts thereof; vinyl acetate-maleic acid ester copolymers and salts thereof; and vinyl acetate-crotonic acid copolymers and salts thereof. Among these, a copolymer of a monomer having a hydrophobic functional group and a monomer having a hydrophilic functional group, and a polymer including a monomer having both a hydrophobic functional group and a hydrophilic functional group are preferable. As the form of the copolymer, any form of a random copolymer, a block copolymer, an alternating copolymer, and a graft copolymer can be used.

Commercially available acrylic resins used as resin dispersants include BYK-187, BYK-190, BYK-191, BYK-194N, BYK-199 (manufactured by BYK Chemie Co., Ltd.), Aron A-210, A6114, AS-1100, AS-1800, A-30SL, A-7250, CL-2 (manufactured by Toagosei Co., Ltd.), and the like.

In addition, commercially available styrene-based resins used as resin dispersants include, for example, X-200, X-1, X-205, X-220, X-228 (manufactured by Seiko PMC Corporation), and Nopcospars (registered trademark), 6100, 6110 (manufactured by San Nopco Ltd.), Joncryl 67, 586, 611, 678, 680, 682, 819 (manufactured by BASF), DISPERBYK-190 (manufactured by BYK Chemie Japan Co., Ltd.), N-EA137, N-EA157, N-EA167, N-EA177, N-EA197D, N-EA207D, E-EN10 (manufactured by DKS Co., Ltd.), and the like.

In addition, examples of commercially available urethane-based resins used as resin dispersants include BYK-182, BYK-183, BYK-184, BYK-185 (manufactured by BYK Chemie Co., Ltd., TEGO Disperse710 (manufactured by Evonik Tego Chemie), Borchi (registered trademark) Gen1350, (manufactured by OMG Borschers), and the like.

The dispersant may be used alone, or may be used in combination of two or more. A total content of the dispersant is 0.2 parts by mass or more and 60 parts by mass or less, preferably 1.0 part by mass or more and 50 parts by mass or less, more preferably 2 parts by mass or more and 40 parts by mass or less, and further more preferably 3.0 parts by mass or more and 30 parts by mass or less, with respect to 100 parts by mass of the white color material. When the content of the dispersant is 0.2 parts by mass or more with respect to 100 parts by mass of the white color material, the dispersion stability of the white color material can be further improved. In addition, when the content of the dispersant is 60 parts by mass or less with respect to 100 parts by mass of the white color material, the viscosity of the obtained dispersion can be suppressed to be small.

Among the dispersants exemplified above, a resin dispersant, in particular, at least one selected from an acrylic resin, a styrene-based resin, and a urethane-based resin is more preferable. In addition, in this case, a weight average molecular weight of the dispersant is more preferably 500 or more. By using such a resin dispersant as the dispersant, the odor is small and the dispersion stability of the white color material can be further improved.

1.2.1.3. Resin Particles

The white ink composition used in the recording method according to the present embodiment may contain resin particles. The resin particles can further improve the adhesion properties of an image due to the white ink composition adhered to a recording medium.

Examples of the resin particles include resin particles including urethane-based resin, acrylic resin, fluorene-based resin, polyolefin-based resin, rosin-modified resin, terpene-based resin, polyester-based resin, polyamide-based resin, epoxy-based resin, vinyl chloride-based resin, and vinyl chloride-vinyl acetate copolymer, ethylene vinyl acetate-based resin, and the like. These resin particles are handled in the form of an emulsion in many cases, but may be in the form of powder. In addition, the resin particles can be used alone, or can be used in combination of two or more.

A urethane-based resin is a general term for a resin having a urethane bond. For the urethane-based resin, a polyether-type urethane resin including an ether bond in the main chain, a polyester-type urethane resin including an ester bond in the main chain, and a polycarbonate-type urethane resin including a carbonate bond in the main chain, in addition to a urethane bond, and the like may be used. As the urethane-based resin, commercially available products may be used, for example, the urethane-based resin selected from the commercially available products such as Superflex 460, 460s, 840, E-4000 (product name, manufactured by DKS Co., Ltd.), Resamine D-1060, D-2020, D-4080, D-4200, D-6300, D-6455 (product name, manufactured by Dainichiseika Color & Chemicals MFG Co., Ltd.), Takelac WS-6021, W-512-A-6 (product name, manufactured by Mitsui Chemicals Polyurethane Co., Ltd.), Sancure 2710 (product name, manufactured by LUBRIZOL), Permarin UA-150 (product name, manufactured by Sanyo Chemical Industries Ltd.), and the like may be used.

An acrylic resin is a general term for polymers obtained by polymerizing at least an acrylic monomer such as (meth)acrylic acid and (meth)acrylic acid ester as one component, and examples thereof include a resin obtained from an acrylic monomer, a copolymer of an acrylic monomer and a monomer other than acrylic monomer, and the like. For example, an acrylic-vinyl resin which is a copolymer of an acrylic monomer and a vinyl-based monomer is exemplified. In addition, for example, a copolymer with a vinyl-based monomer such as styrene is exemplified.

As the acrylic monomer, acrylamide, acrylonitrile, and the like can also be used. For a resin emulsion made from acrylic resin, a commercially available product may be used, for example, a resin emulsion selected from FK-854 (product name, manufactured by Chirika Co., Ltd.), Movinyl 952B, 718A (product name, manufactured by Nippon Synthetic Chemical Industry Co., Ltd.), Nipol LX852, LX874 (product name, manufactured by Nippon Zeon Co., Ltd.), and the like may be used.

As described above, in the present specification, the acrylic resin may be a styrene acrylic resin. In addition, in the present specification, the notation of (meth)acrylic means at least one of acrylic and methacrylic.

The styrene acrylic resin is a copolymer obtained from a styrene monomer and an acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, and the like. As the styrene acrylic resin, a commercially available product may be used, for example, a styrene acrylic resin selected from Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, 7610 (product name, manufactured by BASF), Movinyl 966A, 975N (product name, manufactured by Nippon Synthetic Chemical Industry Co., Ltd.), Vinyblan 2586 (manufactured by Nissin Chemical Industry Co., Ltd.), and the like may be used.

The polyolefin-based resin has an olefin such as ethylene, propylene, and butylene in its structural skeleton, and known ones can be appropriately selected and used. As the olefin resin, a commercially available product can be used, for example, an olefin resin selected from Arrowbase CB-1200, CD-1200 (product name, manufactured by Unitika Ltd.), and the like may be used.

In addition, the resin particles may be supplied in the form of an emulsion, and as examples of commercially available products of such a resin emulsion, Microgel E-1002, E-5002 (product name manufactured by Nippon Paint Co., Ltd., styrene-acrylic resin emulsion), Boncoat 4001 (product name manufactured by DIC Corporation, acrylic resin emulsion), Boncoat 5454 (product name, manufactured by DIC Corporation, styrene-acrylic resin emulsion), Polysol AM-710, AM-920, AM-2300, AP-4735, AT-860, PSASE-4210E (acrylic resin emulsion), Polysol AP-7020 (styrene/acrylic resin emulsion), Polysol SH-502 (vinyl acetate resin emulsion), Polysol AD-13, AD-2, AD-10, AD-96, AD-17, AD-70 (ethylene/vinyl acetate resin emulsion), Polysol PSASE-6010 (ethylene/vinyl acetate resin emulsion) (product name, manufactured by Showa Denko Co., Ltd.), Polysol SAE1014 (product name, styrene-acrylic resin emulsion, manufactured by Nippon Zeon Co., Ltd.), Cybinol SK-200 (product name, acrylic resin emulsion, manufactured by Saiden Chemical Co., Ltd.), AE-120A (product name, manufactured by JSR, acrylic resin emulsion), AE373D (product name, manufactured by E-Tec Co., Ltd., carboxy-modified styrene/acrylic resin emulsion), Seikadyne 1900W (product name, manufactured by Dainichiseika Color & Chemicals MFG Co., Ltd., ethylene/vinyl acetate resin emulsion), Vinyblan 2682 (acrylic resin emulsion), Vinyblan 2886 (vinyl acetate/acrylic resin emulsion), Vinyblan 5202 (acrylic acetate resin emulsion) (product name, manufactured by Nissin Chemical Industry Co., Ltd.), Elitel KA-5071S, KT-8803, KT-9204, KT-8701, KT-8904, KT-0507 (product name, manufactured by Unitika Ltd., polyester resin emulsion), Hi-Tech SN-2002 (product name, manufactured by Toho Chemical Industry Co., Ltd., polyester resin emulsion), Takelac W-6020, W-635, W-6061, W-605, W-635, W-6021 (product name, manufactured by Mitsui Chemicals Polyurethane Co., Ltd., urethane-based resin emulsion), Superflex 870, 800, 150, 420, 460, 470, 610, 700 (product name, manufactured by DKS Co., Ltd., urethane-based resin emulsion), Permarin UA-150 (manufactured by Sanyo Chemical Industries Ltd., urethane-based resin emulsion), Sancure 2710 (manufactured by Nippon Lubrizol, urethane-based resin emulsion), NeoRez R-9660, R-9637, R-940 (manufactured by Kusumoto Chemicals Ltd., urethane-based resin emulsion), Adeka Bontighter HUX-380, 290K (manufactured by ADEKA Corporation, urethane-based resin emulsion), Movinyl 966A, Movinyl 7320 (manufactured by Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, 7610 (hereinabove, manufactured by BASF), NK binder R-5HN (manufactured by Shin Nakamura Chemical Industry Co., Ltd.), Hydran WLS-210 (non-cross-linkable polyurethane: manufactured by DIC Corporation), and Joncryl 7610 (manufactured by BASF) may be selected and used.

A glass transition temperature (Tg) of the resin particles is preferably −50° C. or higher and 200° C. or lower, more preferably 0° C. or higher and 150° C. or lower, and further more preferably 50° C. or higher and 100° C. or lower. As the glass transition temperature (Tg) of the resin particles is within the above range, the resin particles tend to be more excellent in durability and clogging resistance. The glass transition temperature is measured, for example, using a differential scanning calorimeter "DSC7000" manufactured by Hitachi High-Tech Science Co., Ltd., according to JIS K7121, which is a method for measuring the transition temperature of plastics.

In addition, the Tg of the resin particles can be adjusted by adjusting the type and composition ratio of the monomers by paying attention to an individual Tg of each monomer used at a time of resin polymerization. With this, the Tg of the entire resin of the resin particles can be adjusted.

A volume average particle size of the resin particles is preferably 10 nm or more and 300 nm or less, more preferably 30 nm or more and 300 nm or less, further more preferably 30 nm or more and 250 nm or less, and particularly preferably 40 nm or more and 220 nm or less.

A content of the resin particles when the resin particles are contained in a white ink composition is, as solid content, preferably 0.1% by mass or more and 20% by mass or less, more preferably 1% by mass or more and 15% by mass or less, and further more preferably 2% by mass or more and 10% by mass or less, with respect to a total mass of the white ink composition.

1.2.1.4. Water

The white ink composition used in a recording method according to the present embodiment may contain water. As the white ink composition and a non-white ink composition described later are water-based inks, the environmental load can be further reduced. In addition, when the ink is water-based, the white ink composition and the non-white ink composition are likely to be mixed and the image quality (OD value) is likely to be deteriorated. However, in the recording method according to the present embodiment, an image with excellent image quality can be formed. As described above, the white ink composition is preferably a water-based ink. The water-based ink is a composition containing water as one of the main solvent components. Water may be contained as a main solvent component of the white ink composition, and is a component that evaporates and scatters due to drying. The water is preferably water from which ionic impurities such as pure water or ultrapure water such as ion-exchanged water, ultra-filtered water, reverse osmosis water, and distilled water have been removed as much as possible. In addition, when water sterilized by irradiation with ultraviolet rays or addition of hydrogen peroxide is used, the growth of molds or bacteria can be suppressed when the ink is stored for a long period of time, and thus is preferable. A content of water is preferably 40% by mass or more, more preferably 45% by mass or more, further more preferably 50% by mass or more and 99% by mass or less, and particularly preferably 55% by mass or more and 95% by mass or less, with respect to the total amount of the white ink composition.

1.2.1.5. Organic Solvent

The white ink composition used in the recording method according to the present embodiment may contain an organic solvent. One of the functions of the organic solvent is to improve the wettability of the white ink composition with respect to a recording medium or to enhance the moisturizing properties of the white ink composition. Examples of the organic solvent include esters, alkylene glycol ethers, cyclic esters, nitrogen-containing solvents, polyhydric alcohols, and the like. Examples of the nitrogen-containing solvent include cyclic amides and acyclic amides. Examples of the acyclic amides include alkoxyalkylamides.

Examples of esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, methoxybutyl acetate; glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, dipropylene glycol acetate propionate, and the like.

The alkylene glycol ethers may be alkylene glycol monoethers or diethers, and alkyl ethers are preferable. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether; alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, tripropylene glycol dimethyl ether; and the like.

In addition, as the alkylene glycol, diether is more preferable than monoether from a viewpoint that diether tends to dissolve or swell the resin particles in the ink more easily and improves the abrasion resistance of a formed image.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; compounds in which a hydrogen of a methylene group adjacent to the carbonyl group is substituted by an alkyl group having 1 to 4 carbon atoms; and the like.

Examples of alkoxyalkylamides include 3-methoxy-N,N-dimethylpropanamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Examples of cyclic amides include pyrrolidones such as lactams, 2-pyrrolidone, 1-methyl-2-pyrrolidone, 1-ethyl-2-pyrrolidone, 1-propyl-2-pyrrolidone, and 1-butyl-2-pyrrolidone, and the like. These are preferable in terms of promoting film formation of the resin particles, and 2-pyrrolidone is particularly preferable.

These nitrogen-containing solvents are preferable in terms of promoting film formation of the resin particles, and in particular, 2-pyrrolidone and 3-methoxy-N,N-dimethylpropanamide are preferably used, and 2-pyrrolidone is more preferably used.

In addition, as the alkoxyalkylamides, a compound represented by General Formula (1) is also preferably used.

$$R^1—O—CH_2CH_2—(C{=}O)—NR^2R^3 \quad (1)$$

In Formula (1), $R^1$ represents an alkyl group having 1 or more carbon atoms and 4 or less carbon atoms, and $R^2$ and $R^3$ each independently represent a methyl group or an ethyl group. The "alkyl group having 1 or more and 4 or less carbon atoms" can be a linear or branched alkyl group, and can be, for example, a methyl group, an ethyl group, an n-propyl group, an iso-propyl group, an n-butyl group, a sec-butyl group, an iso-butyl group, and a tert-butyl group. The compound represented by Formula (1) may be used alone, or may be used in combination of two or more.

The function of the compound represented by Formula (1) is, for example, to enhance the surface drying properties and fixability of the white ink composition adhered to a low-absorption recording medium. In particular, the compound represented by Formula (1) is excellent in the action of appropriately softening and dissolving a vinyl chloride-based resin. Therefore, the compound represented by Formula (1) can soften and dissolve a surface to be recorded containing the vinyl chloride-based resin, and can allow the white ink composition to permeate into the low-absorption recording medium. By permeating the white ink composition into the low-absorption recording medium in this way, the white ink composition is firmly fixed and the white ink composition is easily dried. Therefore, the obtained image tends to be excellent in surface drying properties and fixability.

In addition, in Formula (1), $R^1$ is more preferably a methyl group having 1 carbon atom. In Formula (1), a standard boiling point of the compound in which $R^1$ is a methyl group is lower than a standard boiling point of the compound in which $R^1$ is an alkyl group having 2 or more and 4 or less carbon atoms. Therefore, in Formula (1), when a compound in which $R^1$ is a methyl group is used, the surface drying properties of the adhesion region, particularly the surface drying properties of the image when recorded in a high temperature and high humidity environment, can be further improved in some cases.

A content when the compound represented by Formula (1) is used is not particularly limited with respect to the total mass of the white ink composition, but is about 5% by mass or more and 50% by mass or less, and preferably 8% by mass or more and 48% by mass or less. As the content of the compound represented by Formula (1) is within the above range, the fixability and surface drying properties of the image, particularly the surface drying properties when recorded in a high temperature and high humidity environment, can be further improved in some cases.

In the white ink composition, the nitrogen-containing solvent is preferably 60% by mass or less, meaning that the nitrogen-containing solvent is not contained in an amount of more than 60% by mass, with respect to the total content of 100% by mass of the organic solvent. In addition, 50% by mass or less is preferable, 30% by mass or less is more preferable, and 20% by mass or less is further more preferable. In particular, the nitrogen-containing solvent is preferably not contained in an amount of more than 18% by mass, more preferably not contained in an amount of more than 12% by mass, further more preferably not contained in an amount of more than 6% by mass, and particularly preferably not contained in an amount of more than 3% by mass. The nitrogen-containing solvent may be 0% by mass, and is 0% by mass or more, with respect to the total content of 100% by mass of the organic solvent. When the content of the nitrogen-containing solvent in the white ink composition is within the above range, the color developability tends to be excellent and the image quality tends to be further improved. It is presumed that this is because the surface smoothness of the recorded object on which an image is formed is improved and the light scattering on the surface can be reduced. In addition, from a viewpoint of abrasion resistance of the recorded object, a nitrogen-containing solvent is preferably contained, but when the content exceeds the above range, the abrasion resistance tends to be inferior. This is because the drying properties of the white ink composition is deteriorated, that is, when there is a portion where the ink is insufficiently dried in the process of forming the image, it is presumed that the white color material is aggregated in the portion and the color material dispersibility in the recorded object becomes non-uniform, and damage is likely to occur starting from the non-uniformity in an ink layer on the recorded object.

The content of the nitrogen-containing solvent with respect to the total mass of the white ink composition is preferably 30% by mass or less. A lower limit may be 0% by mass, and is 0% by mass or more. In addition, 2% to 25% by mass is preferable, 4% to 20% by mass is more preferable, and 8% to 15% by mass is further more preferable.

In addition, when the white ink composition and the non-white ink composition described later contain a nitrogen-containing solvent or only one thereof contains a nitrogen-containing solvent, the content of the nitrogen-containing solvent in the white ink composition is the preferably smaller than the content of the non-white ink composition. With this, the color developability tends to be more excellent, and the image quality tends to be further improved.

It is presumed that this is because the drying properties of the white ink composition is relatively more excellent than the drying properties of the non-white ink composition, the white color material is less likely to aggregate and the color material dispersibility in the recorded object is less likely to become non-uniform, the color material on the surface of the ink layer on the recorded object is uniformly distributed, the surface smoothness is improved, and the light scattering on the surface can be reduced.

In the content of the nitrogen-containing solvent, the content of the white ink composition is smaller than that of the non-white ink composition by preferably 1% by mass or more, by more preferably 3% by mass or more, and by further more preferably 5% by mass or more. In addition, the content is smaller by preferably 15% by mass or less.

Examples of the polyhydric alcohol include 1,2-alkanediol (for example, alkanediols such as ethylene glycol, propylene glycol (also known as propane-1,2-diol), 1,2-butanediol, 1,2-pentanediol, 1,2-hexanediol, 1,2-heptanediol, 1,2-octanediol), polyhydric alcohols (polyols) excluding 1,2-alkanediol (for example, diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, glycerol, and the like), and the like.

Polyhydric alcohols can be divided into alkanediols and polyols. Alkanediols are alkane diols having 5 or more carbon atoms. The number of carbon atoms of the alkane is preferably 5 to 15, more preferably 6 to 10, and further more preferably 6 to 8. 1,2-alkanediol is preferable.

The polyols are alkane polyols having 4 or less carbon atoms or intermolecular condensates of hydroxyl groups of alkane polyols having 4 or less carbon atoms. The number of carbon atoms in the alkane is preferably 2 to 3. The number of hydroxyl groups in the molecule of the polyols is 2 or more, preferably 5 or less, and more preferably 3 or less. When the polyols are the intermolecular condensates described above, the number of intermolecular condensates is 2 or more, preferably 4 or less, and more preferably 3 or less. The polyhydric alcohols may be used alone, or may be used in combination of two or more.

Alkanediols and polyols can mainly function as penetrating solvents and/or moisturizing solvents. However, alkanediols tend to have strong properties as a penetrating solvent, and polyols tend to have strong properties as a moisturizing solvent.

When the white ink composition contains an organic solvent, the organic solvent may be used alone, or may be used in combination of two or more. In addition, a total content of the organic solvent with respect to the total mass of the white ink composition is preferably 30% by mass or less, more preferably 25% by mass or less, further more preferably 18% by mass or less, and particularly preferably 15% by mass or less. When the content of the organic solvent is within the above range, there is a tendency that the balance between the wet spreadability and the drying properties is further improved, the color developability is excellent, and the image quality is further improved. A lower limit is preferably 5% by mass or more, more preferably 10% by mass or more, and further more preferably 15% by mass or more.

A standard boiling point of the organic solvent is preferably 150° C. or higher, more preferably 180° C. or higher, and further more preferably 200° C. or higher. In addition, the standard boiling point of the organic solvent is preferably 280° C. or lower, more preferably 270° C. or lower, and further more preferably 250° C. or lower. When the standard boiling point of the organic solvent is in the above range, the white ink composition is more excellent in clogging recoverability and abrasion resistance, which is preferable.

The white ink composition is a liquid in an environment of 25° C., and preferably does not contain a polyol organic solvent having a standard boiling point of more than 280° C. in an amount of preferably more than 2% by mass, more preferably does not contain thereof in an amount of more than 1.5% by mass, and further more preferably does not contain thereof in an amount of more than 0.5% by mass, with respect to the total mass of the white ink composition. A lower limit of the content is 0% by mass or more and the solvent may not be included. With this, the drying properties of the white ink composition adhered to the recording medium become good, and the adhesion properties of the white ink composition to the recording medium can be improved. Examples of the polyol organic solvent having a standard boiling point of more than 280° C. include glycerol, triethylene glycol, polyethylene glycol monomethyl ether, and the like. It is assumed that the polyol organic solvent having a standard boiling point of more than 280° C. does not contain alkanolamines such as triethanolamine and triisopropanolamine. In addition, setting the content of the organic solvent, which is not limited to the polyol organic solvent, having a standard boiling point of more than 280° C. in the above range is also preferable in the points described above.

A content of the polyhydric alcohol in the white ink composition is preferably 1% by mass or more and 27% by mass or less, more preferably 2% by mass or more and 15% by mass or less, and further more preferably 3% by mass or more and 13% by mass or less, from a viewpoint that abrasion resistance and the like is more excellent.

1.2.1.6. Surfactant

The white ink composition used in the recording method according to the present embodiment may contain a surfactant. The surfactant has a function of lowering a surface tension of the white ink composition and improving the wettability with the recording medium. Among the surfactants, for example, acetylene glycol-based surfactants, silicone-based surfactants, and fluorine-based surfactants can be preferably used.

The acetylene glycol-based surfactant is not particularly limited, and examples thereof include Surfinol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (hereinabove, all product names, manufactured by Air Products & Chemicals, Inc.), Orfin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (hereinabove, all product names, manufactured by Nissin Chemical Industry Co., Ltd.), acetylenol E00, E00P, E40, E100 (hereinabove, all product names, manufactured by Kawaken Fine Chemicals Co., Ltd.), and the like.

The silicone-based surfactant is not particularly limited, and examples thereof preferably include a polysiloxane-based compound. The polysiloxane-based compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (hereinabove, all product names, manufactured by BYK Chemie Japan Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (hereinabove, all product names, manufactured by Shin-Etsu Chemical Co., Ltd.), and the like.

As the fluorine-based surfactant, a fluorine-modified polymer is preferably used, and specific examples thereof include BYK-3440 (manufactured by BYK Chemie Japan Co., Ltd.), Surflon S-241, S-242, and S-243 (hereinabove, all product names, manufactured by AGC Seimi Chemical Co., Ltd.), Futergent 215M (manufactured by Neos Co., Ltd.), and the like.

When the white ink composition contains a surfactant, a plurality of types may be contained. When the white ink composition contains a surfactant, the content thereof is 0.1% by mass or more and 2% by mass or less, preferably 0.4% by mass or more and 1.5% by mass or less, and more preferably 0.5% by mass or more and 1.0% by mass or less, with respect to the total mass of the white ink composition.

1.2.1.7. Wax

The white ink composition used in the recording method according to the present embodiment may contain a wax. Since the wax has a function of imparting smoothness to an image due to the white ink composition, peeling of the image due to the white ink composition can be reduced.

As the components constituting the wax, plant/animal waxes such as carnauba wax, candelilla wax, honey wax, rice wax, and lanolin; petroleum waxes such as paraffin wax, microcrystalline wax, polyethylene wax, polyethylene oxide wax, and petrolatum; mineral waxes such as montan wax and ozokerite; synthetic waxes such as carbon wax, Hoechst wax, polyolefin wax, and stearic acid amide; natural/synthetic wax emulsions such as α-olefin/maleic anhydride copolymer; blended wax, and the like can be used alone, or can be used in combination of a plurality of types thereof. Among these, polyolefin wax, in particular, polyethylene wax and polypropylene wax, and paraffin wax are preferably used from a viewpoint of being more excellent in the effect of enhancing the fixability to a flexible packaging film.

As the wax, commercially available products can be used as it is, and examples thereof include Nopcoat PEM-17 (product name, manufactured by San Nopco Ltd.), Chemipearl W4005 (product name, manufactured by Mitsui Chemicals, Inc.), AQUACER 515, 539, 593 (hereinabove, all product names, manufactured by BYK Chemie Japan Co., Ltd.), and the like.

In addition, when the recording method includes a heating step or the like, a wax having a melting point of preferably 50.0° C. or higher and 200.0° C. or lower, more preferably 70.0° C. or higher and 180.0° C. or lower, further more preferably 90.0° C. or higher and 150.0° C. or lower is preferably used, from a viewpoint of suppressing excessive melting of the wax which leads to deterioration of the performance.

The wax may be supplied in the form of an emulsion or suspension. A content of the wax is 0.1% by mass or more and 10.0% by mass or less, more preferably 0.5% by mass or more and 5.0% by mass or less, and further more preferably 0.5% by mass or more and 2.0% by mass or less in terms of solid content, with respect to the total mass of the white ink composition. When the content of the wax is within the above range, the function of the wax can be favorably exhibited. When one or both of the white ink composition and the non-white ink composition described later contains wax, a function of imparting smoothness to an image can be sufficiently obtained.

1.2.1.8. Additive

The white ink composition used in the recording method according to the present embodiment may contain ureas, amines, saccharides, and the like as additives. Examples of ureas include urea, ethylene urea, tetramethylurea, thiourea, 1,3-dimethyl-2-imidazolidinone, and betaines (trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, acetylcarnitine, and the like), and the like.

Examples of amines include diethanolamine, triethanolamine, triisopropanolamine, and the like. Ureas and amines may function as pH regulators.

Examples of saccharides include glucose, mannose, fructose, ribose, xylose, arabinose, galactose, aldonic acid, glucitol (sorbitol), maltose, cellobiose, lactose, sucrose, trehalose, maltotriose, and the like.

1.2.1.9. Others

The white ink composition used in the recording method according to the present embodiment may further include, depending on the necessity, a component such as an antiseptic/antifungal agent, a rust preventive, a chelating agent, a viscosity modifier, an antioxidant, and an antifungal agent.

1.2.1.10. Physical Properties of White Ink Composition

The white ink composition used in the recording method according to the present embodiment has a surface tension at 25.0° C. of 40.0 mN/m or less, preferably 38.0 mN/m or less, more preferably 35.0 mN/m or less, and further more preferably 30.0 mN/m or less, from a viewpoint of making the wet spreadability to a recording medium appropriate. The surface tension can be measured by checking the surface tension when a platinum plate becomes wet with a composition under an environment of 25.0° C. using an automatic tensiometer CBVP-Z (manufactured by Kyowa Interface Science Co., Ltd.).

A viscosity of the white ink composition used in the recording method according to the present embodiment is preferably 1.5 mPa·s or more and 15.0 mPa·s or less, more preferably 1.5 mPa·s or more and 7.0 mPa·s or less, and further more preferably 1.5 mPa·s or more and 5.5 mPa·s or less, at 20° C. When the white ink composition is adhered to a recording medium by an ink jet method, a predetermined image is easily effectively formed on the recording medium.

1.3. Non-White Ink Adhesion Step

The recording method according to the present embodiment includes a non-white ink adhesion step of adhering a non-white ink composition containing a non-white color material to a recording medium.

1.3.1. Non-White Ink Composition

The non-white ink composition used in the recording method according to the present embodiment contains a non-white color material.

1.3.1.1. Non-White Color Material

The non-white color material contained in the non-white ink composition refers to a color material other than the above-described white color material. Examples of the non-white color material include dyes, pigments, and the like. The non-white color material is preferably a color material such as cyan, yellow, magenta, and black.

Specifically, as the pigments, azo pigments such as insoluble azo pigments, condensed azo pigments, azolakes, and chelate azo pigments; polycyclic pigments such as phthalocyanine pigments, perylene and perinone pigments, anthraquinone pigments, quinacridone pigments, dioxane pigments, thioindigo pigments, isoindrinone pigments, and quinophthalone pigments; dye chelates, dyeing lakes, nitro pigments, nitroso pigments, aniline blacks, daylight fluorescent pigments, carbon blacks, and the like are used. The pigment may be used alone, or may be used in combination of two or more. In addition, as the non-white color material, a bright pigment may be used.

Specific examples of the pigment are not particularly limited, and examples thereof include the following.

Examples of the black pigment include carbon blacks such as No. 2300, No. 900, MCF88, No. 33, No. 40, No. 45, No. 52, MA7, MA8, MA100, No. 2200B, and the like (hereinabove, manufactured by Mitsubishi Chemical Corporation); Raven 5750, Raven 5250, Raven 5000, Raven 3500, Raven 1255, Raven 700, and the like (hereinabove, manufactured by Columbian Carbon Company), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K. K.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like (hereinabove, manufactured by Degussa Corporation).

Examples of the yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, and the like.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57: 1, 88, 112, 114, 122, 123, 144, 146, 149, 150, 166, 168, 170, 171, 175, 176, 177, 178, 179, 184, 185, 187, 202, 209, 219, 224, 245, C.I. Pigment Violet 19, 23, 32, 33, 36, 38, 43, 50, and the like.

Examples of the cyan pigments include C.I. Pigment Blue 1, 2, 3, 15, 15: 1, 15: 2, 15: 3, 15:34, 15: 4, 16, 18, 22, 25, 60, 65, 66, C.I. Bat blue 4, 60, and the like.

In addition, pigments other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, 63, and the like.

The pearl pigments are not particularly limited, and examples thereof include pigments having pearl luster and interference luster such as titanium dioxide-coated mica, fish scale foil, and acidified bismuth.

The metallic pigment is not particularly limited, and examples thereof include particles including single bodies or alloys such as aluminum, silver, gold, platinum, nickel, chromium, tin, zinc, indium, titanium, and copper.

In addition, as dyes, for example, various dyes usually used for ink jet recording such as direct dyes, acidic dyes, edible dyes, basic dyes, reactive dyes, dispersion dyes, construction dyes, soluble construction dyes, reaction dispersion dyes, and the like can be used.

A non-white color material that can be stably dispersed or dissolved in water is preferable, and depending on the necessity, the non-white color material may be dispersed using a dispersant. Examples of the dispersant include dispersants similar to those used to improve the dispersibility of the white color material of the white ink composition described above.

A content of the non-white color material is preferably 0.3% by mass or more and 20.0% by mass or less, more preferably 0.5% by mass or more and 15.0% by mass or less, and particularly preferably 0.5% by mass or more and 6.0% by mass or less, with respect to the total mass of the non-white ink composition. When the content of the non-white color material is within the above range, clogging of the nozzles of the recording apparatus is unlikely to occur, and an image more excellent in color developability and more excellent in image quality can be formed in some cases. The non-white color material contained in the non-white ink composition may have high or low cohesiveness, but the non-white color material preferably has high cohesiveness from a viewpoint of having more excellent bleeding resistance and the like.

When a pigment is adopted for the non-white color material, a volume average particle size of the pigment particles is preferably 10 nm or more and 300 nm or less, more preferably 30 nm or more and 250 nm or less, further more preferably 50 nm or more and 250 nm or less, and particularly preferably 70 nm or more and 200 nm or less.

The volume average particle size of the non-white color material is measured as an initial state by a method of checking the above-described volume average particle size. When the volume average particle size is in the above range, it is preferable from a viewpoint that a desired color material is easily obtained or characteristics of the color material and the like are preferable.

1.3.1.2. Other Components

The non-white ink composition used in the recording method according to the present embodiment may contain components such as resin particles, an organic solvent, a surfactant, water, a wax, an additive, a resin dispersant, an antiseptic/antifungal agent, a rust preventive, a chelating agent, a viscosity modifier, an antioxidant, and an antifungal agent, in addition to the non-white color material.

Since all of these components are the same as the above-described white ink composition, detailed description thereof will be omitted by replacing "white ink composition" with "non-white ink composition". The non-white ink composition may contain these components in the white ink composition, or a preferable content thereof may be contained independently of the white ink composition.

1.3.1.3. Physical Properties

A viscosity of the non-white ink composition used in the recording method according to the present embodiment is preferably 1.5 mPa·s or more and 15.0 mPa·s or less, more preferably 1.5 mPa·s or more and 7.0 mPa·s, and further more preferably 1.5 mPa·s or more and 5.5 mPa·s or less, at 20° C. When the non-white ink composition is adhered to the recording medium by the ink jet method, a predetermined image is easily effectively formed on the recording medium.

The non-white ink composition used in the recording method according to the present embodiment preferably has a surface tension at 25.0° C. of 40.0 mN/m or less, preferably 38.0 mN/m or less, more preferably 35.0 mN/m or less, and further more preferably 30.0 mN/m or less, from a viewpoint of making the wet spreadability to a recording medium appropriate. The surface tension is measured in the same manner as the white ink composition described above.

1.4. Aspects in the White Ink Adhesion Step and the Non-White Ink Adhesion Step

In the recording method according to the present embodiment, the white ink adhesion step and the non-white ink adhesion step described above are performed by relative scanning between the recording head and the recording medium, the white ink adhesion step and the non-white ink adhesion step are performed by the same relative scanning on the same scanning region of the recording medium, and in the recording region to which the white ink composition and the non-white ink composition are adhered, an adhesion amount of the white ink composition is 60% by mass or less with respect to an adhesion amount of 100% by mass of the non-white ink composition per unit region.

By using the recording apparatus described later, the white ink adhesion step and the non-white ink adhesion step can be performed by relative scanning between the recording head and the recording medium, and the white ink adhesion step and the non-white ink adhesion step can be performed by the same relative scanning on the same scanning region of the recording medium.

The "scanning region" refers to a trajectory region of projection on the recording medium when a relative positional relationship between the recording head and the recording medium is changed by moving the position of one of the recording head or the recording medium while projecting the recording head in a recording medium direction. Alternatively, the scanning region includes a trajectory region of projection on the recording medium when the relative positional relationship between the recording head and the recording medium is changed by moving the positions of both the recording head and the recording medium while projecting the recording head in the recording medium direction. Alternatively, the scanning region refers to a portion on the recording medium in which the recording head moves to a position relative to the recording medium when scanning is performed.

The scanning referred to here is scanning in the ink adhesion step, scanning performed while ejecting ink, and is also referred to as main scanning.

Relative scanning refers to scanning performed by moving the position of one of the recording head or the recording medium. That is, the recording head may be moved relative to the recording medium or the recording medium may be moved relative to the recording head.

Performing the white ink adhesion step and the non-white ink adhesion step by the same relative scanning means that the scanning for performing the white ink adhesion step and the scanning for performing the non-white ink adhesion step are performed at the same time.

Performing the white ink adhesion step and the non-white ink adhesion step by the same relative scanning on the same scanning region of the recording medium means that the scanning regions of the white ink and the non-white ink performed by the same scanning has at least a partially overlapping region.

Recording may be performed by performing a plurality of times of scanning such that the white ink adhesion step and the non-white ink adhesion step are performed by the same relative scanning on the same scanning region of the recording medium. When the plurality of times of scanning is performed, sub-scanning is preferably performed between the scanning. The sub-scanning is performed by moving the relative position of one of the recording head or the recording medium in a direction intersecting the scanning direction described above. In this way, the relative positions of the recording head and the recording medium differ between the scanning in the direction intersecting the scanning directions. In the sub-scanning, ink is not ejected from the recording head to the recording medium. Therefore, the sub-scanning is not scanning. The sub-scanning may also be relative scanning. That is, the recording head may be moved relative to the recording medium or the recording medium may be moved relative to the recording head.

The scanning when the scanning is performed a plurality of times and the sub-scanning is also performed is particularly referred to as main scanning.

In this way, in the recording region to which the white ink composition and the non-white ink composition are adhered, the adhesion amount, or adhesion amount ratio of the white ink composition is 60% by mass or less, preferably 50% by mass or less, more preferably 45% by mass or less, and more preferably 30% by mass or less, further more preferably 20% by mass or less, and particularly preferably 15% by mass or less, with respect to the adhesion amount of 100% by mass of the non-white ink composition per unit region. On the other hand, the adhesion amount ratio is not limited to a lower limit, but is preferably 1% by mass or more, more preferably 5% by mass or more, and further more preferably 10% by mass or more. In addition, 30% by mass or more is preferable. Within such a range, an image excellent in image quality can be formed, and excellent printing speed can also be achieved. In addition, it is preferable from a viewpoint that the component, particularly the pigment, of the white ink imparts the image concealing properties.

Here, the "unit region" is a region having a predetermined area, and may be a unit region having an area such that the ratio of the adhesion amount of white ink to the adhesion amount of non-white ink can be checked. When performing recording with only white ink and with only non-white ink, both a concentration of the white ink and a concentration of the non-white ink are preferably constant at each site within the unit area. The unit region is, for example, a 1×1 mm region. Or, the unit region is a 2×2 mm region or a 3×3 mm region. In addition, the recording region may have at least a region in which the adhesion amount of the white ink composition is within the above range with respect to 100% by mass of the adhesion amount of the non-white ink composition per unit region, but preferably, in the recording region, a maximum value of the adhesion amount ratio is preferably in the above range.

In addition, in the region in which the adhesion amount of the non-white ink composition is the maximum adhesion amount in the recording region, the adhesion amount of the white ink composition with respect to the adhesion amount of the non-white ink composition per unit region preferably satisfies the above relationship. More preferably, in a region in which the adhesion amount of the non-white ink composition is equal to or less than the maximum adhesion amount in the recording region and equal to or more than half of the maximum adhesion amount, the adhesion amount of the white ink composition with respect to the adhesion amount of the non-white ink composition per unit region is within the above range. Further more preferably, in a region in which the adhesion amount of the non-white ink composition is equal to or less than the maximum adhesion amount and 20% or more of the maximum adhesion amount in the recording region, the adhesion amount of the white ink composition with respect to the adhesion amount of the non-white ink composition per unit region is within the above range.

In the recording region to which the white ink composition and the non-white ink composition are adhered, the maximum adhesion amount of the white ink composition is preferably 7 mg/inch$^2$ or less, more preferably 5 mg/inch$^2$ or less, further more preferably 1.5 mg/inch$^2$ or less, and particularly preferably 1 mg/inch$^2$ or less. In addition, the maximum adhesion amount is preferably 0.1 mg/inch$^2$ or more, more preferably 0.3 mg/inch$^2$ or more, and further more preferably 0.5 mg/inch$^2$ or more. In addition, 1 mg/inch$^2$ or more is preferable. When the maximum adhesion amount of the white ink composition is within the above range, a contact boundary area with the non-white ink composition increases and mixing becomes easy, and thus the image quality tends to be excellent.

In addition, in the recording region to which the white ink composition and the non-white ink composition are adhered, the maximum adhesion amount of the non-white ink composition is preferably 15 mg/inch$^2$ or less, more preferably 13 mg/inch$^2$ or less, further more preferably 11 mg/inch$^2$ or less, and particularly preferably 9 mg/inch$^2$ or less. In addition, the maximum adhesion amount is preferably 4 mg/inch$^2$ or more, more preferably 5 mg/inch$^2$ or more, and further more preferably 7 mg/inch$^2$ or more. When the maximum adhesion amount of the non-white ink composition is within the above range, a contact boundary area with the white ink composition increases and mixing becomes easy, and thus the image quality tends to be excellent.

When adhesion of ink is performed by a plurality of times of scanning on a unit region, the above-described adhesion amount ratio or each adhesion amount is a total adhesion amount ratio or adhesion amount of ink of the plurality of times of scanning.

The adhesion amount of the non-white ink differs depending on the color or concentration of the image due to the site in the image in some cases, but even in the case, the adhesion amount ratio is preferably in the above range at each site in the image. In this case, the adhesion amount of white ink may differ depending on the adhesion amount of non-white ink at each site in the image, which is preferable. In this case, the adhesion amount ratio is preferably easily within the above range at each site in the image.

1.5. Recording Apparatus

An example of a recording apparatus in which the recording method according to the present embodiment is performed will be described with reference to the drawings.

Figure 2:
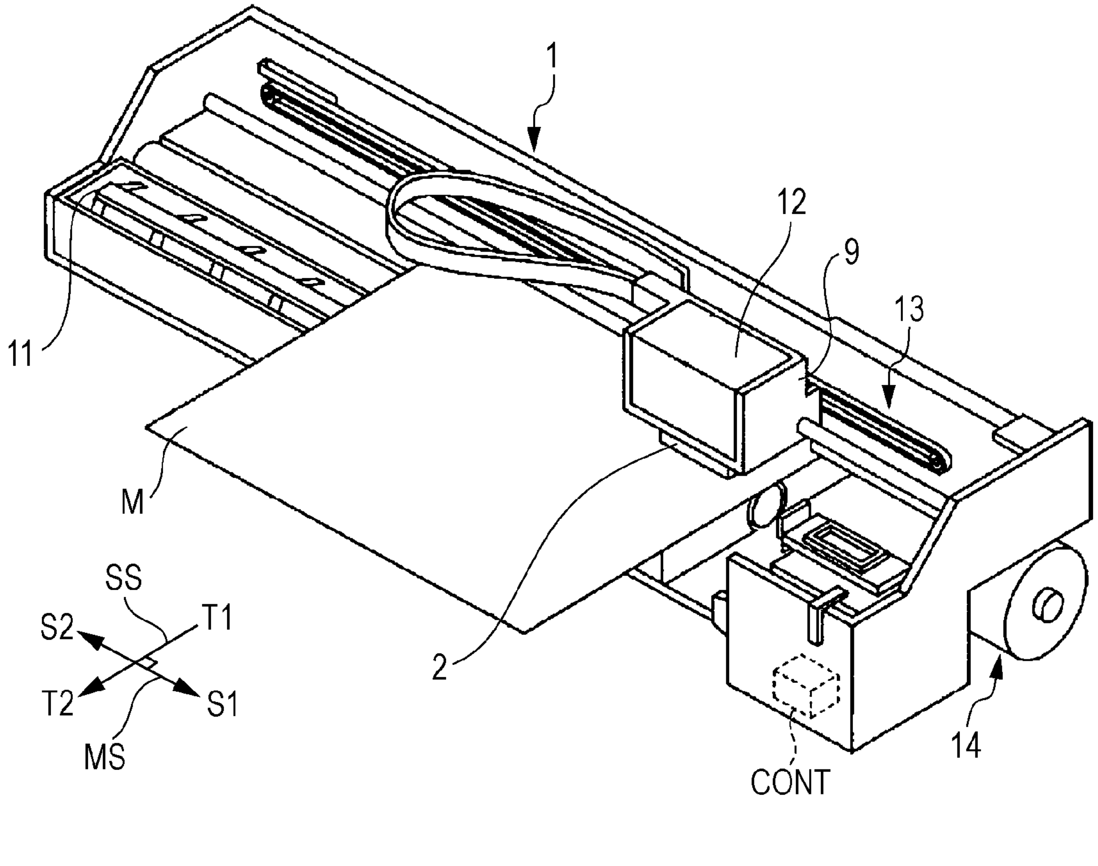
FIG. 2 is a schematic view around a carriage of an example of the recording apparatus used in the recording method according to the embodiment.

FIG. 1 is a schematic cross-sectional view schematically showing a recording apparatus. FIG. 2 is a perspective view showing an example of the configuration around a carriage of a recording apparatus 1 of FIG. 1. As shown in FIGS. 1 and 2, the recording apparatus 1 includes a recording head 2, an IR heater 3, a platen heater 4, a heater 5, a cooling fan 6, a preheater 7, a ventilation fan 8, a carriage 9, a platen 11, a carriage moving mechanism 13, a transport unit 14, and a control portion CONT. In the recording apparatus 1, operation of the entire recording apparatus 1 is controlled by the control portion CONT shown in FIG. 2.

1.5.1. Recording Head

The recording head 2, which, hereinafter, is also simply referred to as "head 2", included in the recording apparatus in which the recording method according to the present embodiment is performed is relatively scanned with respect to a recording medium M.

Here, "relative scanning between the recording head and the recording medium" includes that a relative positional relationship between the recording head and the recording medium is changed by moving the position of one of the recording head or the recording medium, or that the relative positional relationship between the recording head and the recording medium is changed by moving the positions of both the recording head and the recording medium.

The method in which the head 2 ejects liquid droplets may be any method. Examples of the recording method of the head 2 include a method in which a strong electric field is applied between the nozzle and an acceleration electrode placed in front of the nozzle, ink is continuously sprayed from the nozzle in the form of liquid droplets, and a printing information signal is imparted to a polarization electrode while ink droplets fly between deflection electrodes, or a method in which ink droplets are sprayed in response to a printing information signal without polarizing thereof, which is an electrostatic suction method, a method of forcibly spraying ink droplets by adding a pressure to an ink liquid with a small pump and mechanically vibrating a nozzle with a crystal oscillator, a method of simultaneously adding a pressure and a printing information signal to an ink liquid with a piezoelectric element to spray/record ink droplets, which is a piezo method, a method of heating and foaming an ink liquid by a microelectrode according to a printing information signal to spray/record ink droplets, which is a thermal jet method, and the like.

Among these, the piezo method can be further classified, and can be classified into those having a thin film type recording head and those having a laminated type recording head. The thin film type recording head includes a so-called unimorph type piezoelectric actuator, and the ink composition is ejected from the nozzle by the displacement of the piezoelectric actuator. On the other hand, the laminated type recording head is a recording head of an aspect in which a wall of a pressure chamber communicating with the nozzle is pushed and ejection from the nozzle is performed by driving of a d31 mode of the laminated type piezoelectric element.

A head configured to ejecting liquid droplets by these methods is referred to as an ink jet head. The recording head 2 of the present embodiment is not particularly limited, but is preferably an ink jet head. That is, in the white ink adhesion step and the non-white ink adhesion step described above, ink is preferably ejected from the ink jet head. In this regard, when the recording apparatus 1 in which the recording method according to the present embodiment is performed is in an aspect, which is a serial type, in which the position of the head 2 is moved, high-speed operation can be performed, and an image of higher definition and higher quality can be formed at high speed.

In the serial type recording apparatus 1 as shown in FIG. 2, relative scanning between the recording head 2 and the recording medium M is performed by operation of the carriage moving mechanism 13 that moves the carriage 9 in a medium width direction of the recording medium M. The medium width direction is a main scanning direction of the recording head 2. Scanning in the main scanning direction is also referred to as main scanning.

In addition, here, the main scanning direction is a moving direction of the carriage 9 on which the recording head 2 is mounted. In FIG. 1, the main scanning direction is a direction intersects the sub-scanning direction, which is a transport direction of the recording medium M indicated by the arrow SS. In FIG. 2, a width direction of the recording medium M, that is, a direction represented by S1-S2 is a main scanning direction MS, and a direction represented by T1→T2 is a sub-scanning direction SS.

One time of operation in which the recording head 2 forms an image while scanning in the main scanning direction MS, that is, in any one direction of the arrow S1 or the arrow S2 is referred to as "main scanning" or "pass". A case where a moving direction of the recording head 2 in the main scanning direction MS is the same in the pass 1 and the pass 2 is referred to as "unidirectional printing", and a case where a moving direction of the main scanning direction MS of the recording head 2 is different in the pass 1 and the pass 2 is referred to as "bidirectional printing".

In the unidirectional printing, for example, in the pass 1, the recording head 2 ejects ink while moving in the direction of the arrow S2. After that, the recording head 2 is moved in the direction of the arrow S1 to return to an original position, which is return operation, the recording medium M is moved in the T1→T2 direction by a predetermined distance, and the printing operation of the pass 2 is performed in the same manner as the pass 1. In the unidirectional printing, since the ink is ejected in the same direction as the main scanning direction MS, there is little deviation in a landing position of ink dots in the main scanning direction MS, and the unidirectional printing is suitable for a case of printing an image with good image quality. In addition, when a white ink nozzle row in the recording head is arranged in the main scanning direction of the pass ahead of the non-white ink nozzle row, an image more excellent in color developability and excellent in image quality can be formed in some cases, when viewed from an image forming surface side of the recording medium. In addition, on the contrary, when the white ink nozzle row in the recording head is arranged on a trailing side of the non-white ink nozzle row in the main scanning direction of the pass, an image more excellent in color developability and excellent in image quality can be formed in some cases, when viewed from a back of the image forming surface side of the recording medium.

In the bidirectional printing, for example, in the pass 1, the recording head 2 ejects ink while moving in a direction of the arrow S2. After that, the recording medium M is moved in the T1→T2 direction by a predetermined distance, and in the pass 2, the ink is ejected while moving in the direction of the arrow S1 opposite to the pass 1. In the bidirectional printing, the return operation of the recording head 2 becomes unnecessary, and two rows of dot lines can be formed while the recording head 2 reciprocates in the main scanning direction MS. Therefore, the time required for printing can be shortened as compared with the case of the unidirectional printing. In addition, when recording is performed on a colorless and transparent recording medium, the image recorded by the bidirectional printing is advantageous from a viewpoint that the image is likely to be seen in the same color, when viewed from a side in which the image of the recording medium is formed and when viewed from the opposite side thereto.

In addition, in the recording method according to the present embodiment, scanning of performing the white ink adhesion step and the non-white ink adhesion step described above by the same scanning on the same scanning region of the recording medium may be performed a plurality of times, on the scanning region in which scanning by one time of scanning is performed. That is, the recording method according to the present embodiment may be multipass recording. In the multipass recording, the white ink composition and the non-white ink composition are more likely to be mixed, and thus the image quality tends to be inferior. However, in the recording method according to the present embodiment, an image excellent in image quality can be formed even in the multipass recording. The "multipass recording" refers to a recording operation in which the formation of each dot in the main scanning direction MS is completed in P times of pass, P being an integer of 2 or more.

Figure 3:
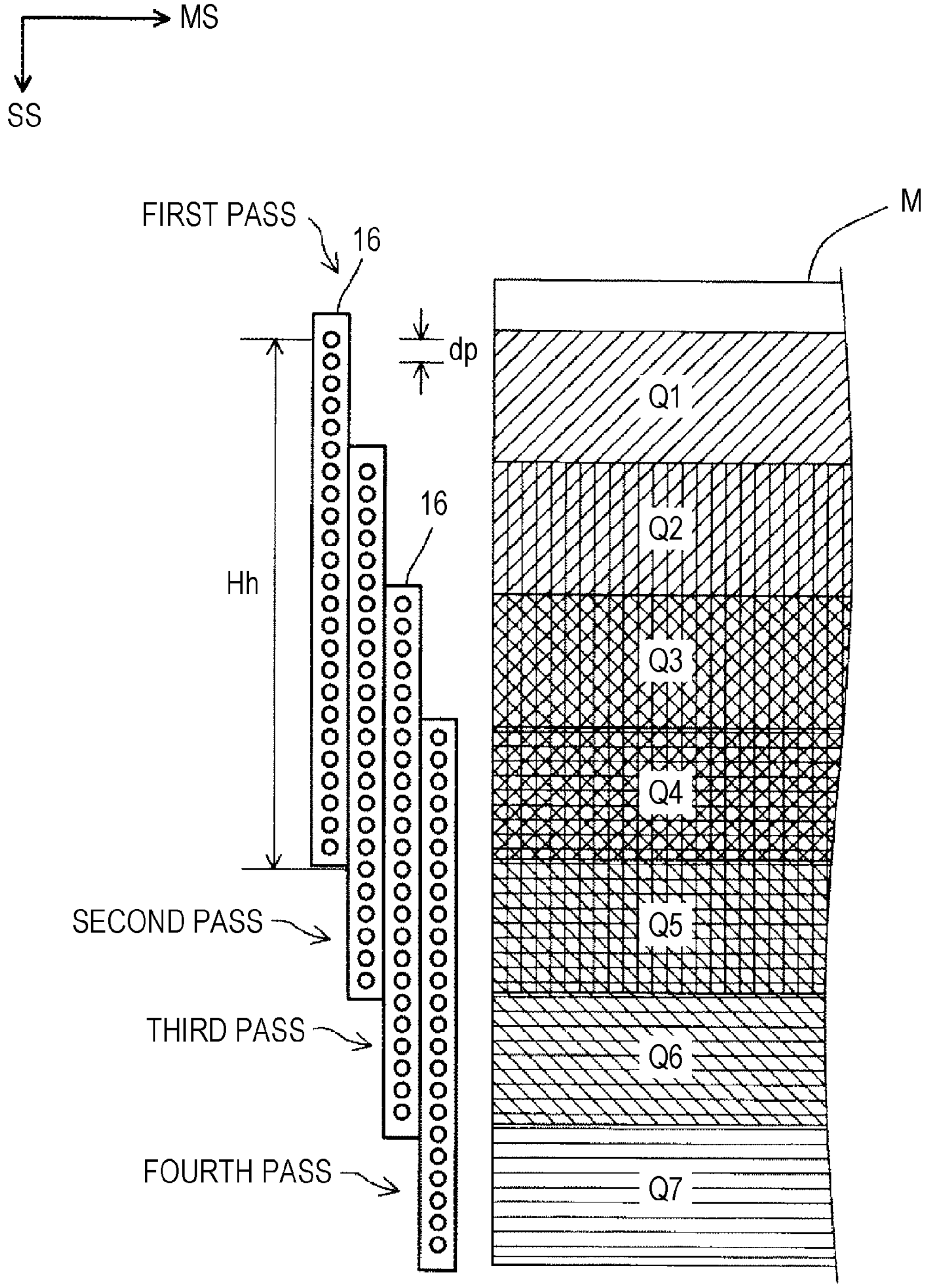
FIG. 3 is a schematic view showing a position of a nozzle row in each pass and a recording region at the position.

Multipass recording will be specifically described with reference to FIG. 3. FIG. 3 is a schematic view showing the position of the nozzle row in each pass and the recording region at the position. In the following description, a case where dots are formed in all pixels of the recording medium M in 4 passes using one color ink, which is, for example, a white ink composition, will be described as an example.

In the first (n+1st pass, n being an integer of 0 or more) pass (1P) and the second (n+2nd pass) pass (2P), the position of a nozzle row 16 is deviated in a sub-scanning direction by a distance corresponding to ¼ of head height Hh. For the 3rd (n+3rd pass) pass (3P) and the 4th (n+4th pass) pass (4P), the position of the nozzle row 16 is deviated in a sub-scanning direction by a distance corresponding to ¼ of the head height Hh from the position of the previous pass, respectively. Here, the "head height Hh" means a distance represented by N×dp, N being the number of nozzles in the nozzle row 16 and dp being the nozzle pitch.

In the n+1st pass, dots are recorded in some pixels of all the pixels in regions Q1 to Q4 in the recording medium M. In the n+2nd pass, dots are recorded in some pixels of all the pixels in regions Q2 to Q5 in the recording medium M. In the n+3rd pass, dots are recorded in some pixels of all the pixels in regions Q3 to Q6, respectively, and in the n+4th pass, dots are recorded in some pixels of all the pixels in regions Q4 to Q7. In the region Q4, 100% pixel recording is performed in a total of 4 times of passes of the n+1st, the n+2nd, the n+3rd, and the n+4th. Here, it is assumed that an image, which is a solid image, in which dots are formed on all the pixels of the recording medium M, is formed on the recording medium M, but the recorded image, or printed image, represented by the actual dot data includes a pixel that actually forms dots on the recording medium M and a pixel that does not actually form dots on the recording medium M. That is, whether or not dots are actually formed in each pixel of the recording medium M is determined by the dot data generated by the halftone processing.

The number of times of scanning performed on the same scanning region is referred to as the number of times of scanning or the number of passes. For example, in FIG. 3, the number of times of scanning is the number of times of scanning performed at a length in an SS direction, which is a quarter of a length of the nozzle row 16, in which the recording head moves to a position relative to the recording medium in one time of sub-scanning, and on a scanning region extending in an MS direction. In the example of FIG. 3, the number of times of scanning is 4. The number of times of scanning is 1 or more, preferably 2 or more, more preferably 3 or more, and further more preferably 4 or more. In addition, although not limited, 24 or less is preferable, 16 or less is more preferable, and 10 or less is further more preferable.

Figure 4:
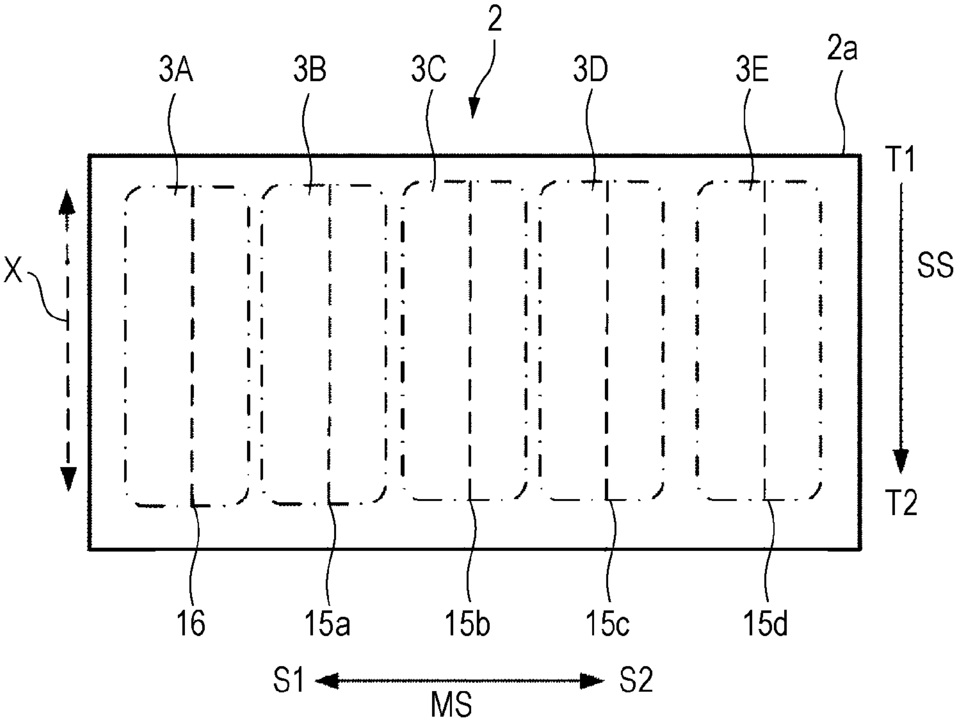
FIG. 4 is a schematic plan view schematically showing an example of an arrangement of nozzle rows in a recording head of an example of the recording apparatus used in the recording method according to the embodiment.

The arrangement of the nozzle rows on the nozzle surface of the recording head 2 included in the recording apparatus in which the recording method according to the present embodiment is performed will be described with reference to FIG. 4. FIG. 4 schematically shows an example of an arrangement of nozzle rows on a nozzle surface 2*a* of the recording head 2. The recording head 2 has the nozzle surface 2*a* including a plurality of nozzle rows for ejecting a white ink composition or a non-white ink composition. In the example shown in FIG. 4, the nozzle surface 2*a* of the recording head 2 has a plurality of non-white ink nozzle rows 15*a* to 15*d* in which a plurality of nozzles filled with the non-white ink composition is arranged in the sub-scanning direction, and a white ink nozzle row 16 in which a plurality of nozzles filled with the white ink composition is arranged in the sub-scanning direction. In the present specification, a portion of the recording head 2 having the white ink nozzle row 16 is also referred to as a white ink head, and a portion of the recording head 2 having the non-white ink nozzle rows 15*a* to 15*d* is also referred to as a non-white ink head. The white ink nozzle row 16 may be one row, or may be a plurality of rows, and in the example shown in FIG. 4, the white ink nozzle row 16 is one row. In addition, in the example shown in FIG. 4, the white ink nozzle row 16 is arranged on an arrow S1 side of the main scanning direction MS, but the arrangement positions of the white ink nozzle row 16 and the non-white ink nozzle rows 15*a* to 15*d* are not particularly limited. In the following, among the non-white ink nozzle rows 15*a* to 15*d*, the portion used in recording and for ejecting ink at a time of recording is referred to as a non-white ink ejection nozzle row. Similarly, in the white ink nozzle row 16, the portion used in recording and for ejecting the white ink composition at the time of recording is referred to as a white ink ejection nozzle row.

In the present embodiment, in an example of the arrangement of the nozzle rows shown in FIG. 4, when the non-white ink nozzle rows 15*a* to 15*d* and the white ink nozzle row 16 are projected along a main scanning axis MS, the white ink nozzle row 16 has a portion that overlaps with the non-white ink nozzle rows 15*a* to 15*d* in the sub-scanning direction. Here, the overlapping portion is a range indicated by X in FIG. 4, and indicates a length in the sub-scanning direction indicated by X that coincides with a region 3A in which the white ink nozzle row 16 is present and regions 3B to 3E in which the non-white ink nozzle rows 15*a* to 15*d* are present.

In the example shown in FIG. 4, the overlapping portion X is 100% of the length of the white ink nozzle row 16 in the sub-scanning direction and 100% of the length of the non-white ink nozzle rows 15*a* to 15*d* in the sub-scanning direction. In addition, the non-white ink nozzle rows 15*a* to 15*d* are all non-white ink ejection nozzle rows, and the white ink nozzle rows 16 are all white ink ejection nozzle rows. In this way, when the overlapping portion X is a 100% arrangement, and the used nozzle row is 100% for each nozzle row, the white ink adhesion step and the non-white ink adhesion step described above can be performed by the same relative scanning on the same scanning region of the recording medium. In addition, since the used nozzle rows are arranged side by side, a length of the recording head 2 in the sub-scanning direction can be shortened, and as a result, the entire device can be miniaturized.

A length of the portion X is not limited to 100% with respect to a length of the white ink nozzle row 16 in the sub-scanning direction and a length of the non-white ink nozzle row 15*a* in the sub-scanning direction, and the portion X may be included in the nozzle row.

1.5.2. Other Configurations

As shown in FIG. 2, a cartridge 12 that supplies the white ink composition or the non-white ink composition to the recording head 2 includes a plurality of independent cartridges. The cartridge 12 is detachably mounted on a carriage 9 on which the recording head 2 is mounted. Each of the plurality of cartridges is filled with different types of ink compositions, and the white ink composition or the non-white ink composition is supplied to each nozzle from the cartridge 12. In the present embodiment, an example in which the cartridge 12 is mounted on the carriage 9 is shown, but the cartridge 12 is not limited to this, and may be in the form of being provided on a site other than the carriage 9 and supplied to each nozzle through a supply pipe not shown in the figure.

As shown in FIG. 1, the recording apparatus 1 includes an IR heater 3 and a platen heater 4 that heats the recording medium M when ejecting a white ink composition or a non-white ink composition from the recording head 2. In the present embodiment, when the recording medium M is dried in the drying step, the IR heater 3, the ventilation fan 8 described later, and the like can be used.

When the IR heater 3 is used, the recording medium M can be heated in a radiating manner due to radiation of infrared rays from the recording head 2 side. With this, the recording head 2 is also likely to be heated at the same time, but the temperature can be raised without being affected by a thickness of the recording medium M as compared with a case in which the recording medium M is heated from a back surface of the recording medium M such as the platen heater 4. In addition, there may be provided various fans, for example, the ventilation fan 8, which blows warm air or air having the same temperature as the environment to the recording medium M to dry the ink composition on the recording medium M.

The recording medium M can be heated through a platen 11 at a position opposing the recording head 2 so that the platen heater 4 can be dried at an early stage from a time point when the white ink composition or the non-white ink composition ejected by the recording head 2 is adhered to the recording medium M. The platen heater 4 is configured to heat the recording medium M in a conductive manner, and is used, depending on the necessity, in the recording method of the present embodiment. When used, a surface temperature of the recording medium M is preferably controlled to be 40.0° C. or lower.

An upper limit of the surface temperature of the recording medium M by the IR heater 3 and the platen heater 4 is preferably 60° C. or lower, and more preferably 50° C. or lower. In addition, the upper limit is preferably 45.0° C. or lower, more preferably 40.0° C. or lower, further more preferably 38.0° C. or lower, and particularly preferably 35.0° C. or lower. In addition, a lower limit of the surface temperature of the recording medium M is preferably 25.0° C. or higher, more preferably 28.0° C. or higher, further more preferably 30.0° C. or higher, and particularly preferably 32.0° C. or higher. In addition, the lower limit is preferably 40° C. or higher. With this, the drying and composition fluctuation of the white ink composition and the non-white ink composition in the recording head 2 can be suppressed, and the welding of a resin in the ink composition to an inner wall of the recording head 2 is suppressed. In addition, the white ink composition or the non-white ink composition can be fixed on the recording medium M at an early stage, and the image quality can be improved.

The heater 5 is a heater that dries and solidifies the white ink composition or non-white ink composition adhered to the recording medium M, that is, a heater for secondary heating or secondary drying. The heater 5 can be used in the post-heating step. As the heater 5 heats the recording medium M on which the image is recorded, moisture and the like contained in the ink composition evaporate and scatter more quickly, and the resin contained in the ink composition forms an ink film. In this way, the ink film is firmly fixed or adhered on the recording medium M to have excellent film-forming properties, and an excellent high-quality image can be obtained in a short time. An upper limit of the surface temperature of the recording medium M by the heater 5 is preferably 120.0° C. or lower, more preferably 100.0° C. or lower, and further more preferably 90.0° C. or lower. In addition, a lower limit of the surface temperature of the recording medium M is preferably 60.0° C. or higher, more preferably 70.0° C. or higher, and further more preferably 80.0° C. or higher. When the temperature is in the above range, a high-quality image can be obtained in a short time.

The recording apparatus 1 may have a cooling fan 6. After the ink composition recorded on the recording medium M is dried, the ink composition on the recording medium M is cooled by the cooling fan 6, and thus an ink coating film can be formed on the recording medium M with good adhesion properties.

In addition, the recording apparatus 1 may include a preheater 7 that preheats the recording medium M before the white ink composition or the non-white ink composition is adhered to the recording medium M. In addition, the recording apparatus 1 may include a ventilation fan 8 so that the white ink composition or the non-white ink composition adhered to the recording medium M is more efficiently dried.

Below the carriage 9, there are provided a platen 11 that supports the recording medium M, a carriage moving mechanism 13 that moves the carriage 9 relative to the recording medium M, and a transport unit 14 which is a roller that transports the recording medium M in the sub-scanning direction. Operations of the carriage moving mechanism 13 and the transport unit 14 are controlled by the control portion CONT.

Figure 5:
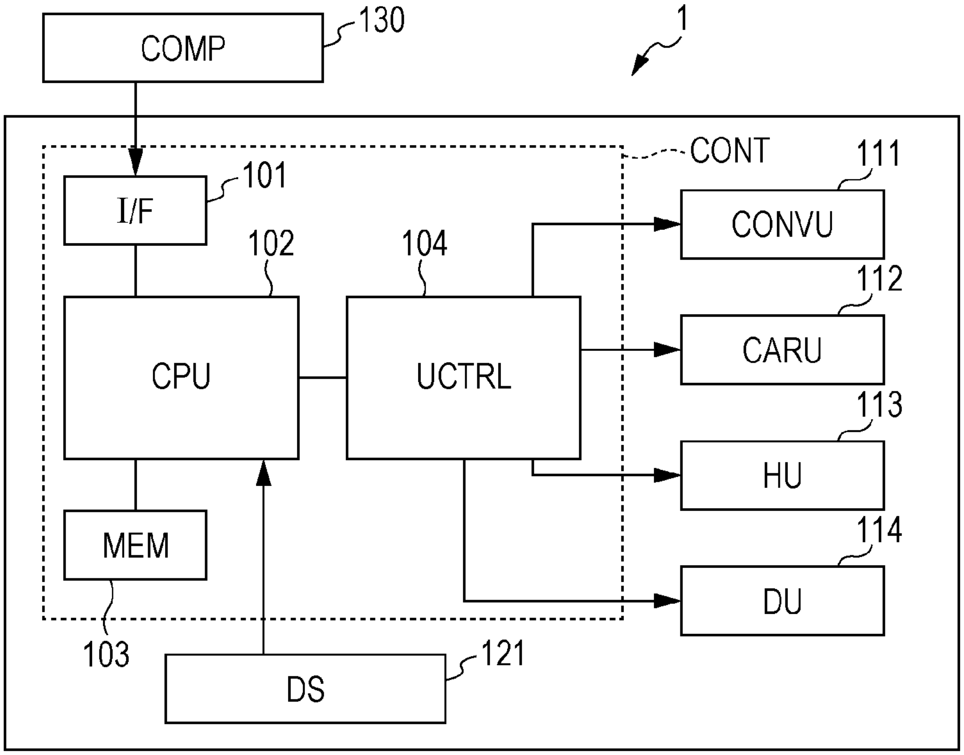
FIG. 5 is a block diagram of an example of the recording apparatus used in the recording method according to the embodiment.

FIG. 5 is a functional block diagram of the recording apparatus 1. The control portion CONT is a control unit that performs control of the recording apparatus 1. An interface portion 101 (I/F) is for performing transmission and reception of data between a computer 130 (COMP) and the recording apparatus 1. A CPU 102 is an arithmetic processing device for performing control of the entire recording apparatus 1. A memory 103 (MEM) is for securing a region that stores a program of the CPU 102, a work region, or the like. The CPU 102 controls each unit by a unit control circuit 104 (UCTRL). The detector group 121 (DS) monitors a status in the recording apparatus 1, and the control portion CONT controls each unit based on the detection result.

A transport unit 111 (CONVU) controls the sub-scanning (transport) of recording, and specifically controls a transport direction and a transport speed of the recording medium M. Specifically, the transport direction and the transport speed of the recording medium M are controlled by controlling a rotation direction and a rotation speed of the transport roller driven by a motor.

A carriage unit 112 (CARU) controls the main scanning (pass) of recording, and specifically, reciprocates the recording head 2 in the main scanning direction. The carriage unit 112 includes the carriage 9 on which the recording head 2 is mounted, and the carriage moving mechanism 13 that reciprocates the carriage 9.

A head unit 113 (HU) controls an ejection amount of the white ink composition or the non-white ink composition from the nozzle of the recording head 2. For example, when the nozzle of the recording head 2 is driven by a piezoelectric element, the operation of the piezoelectric element in each nozzle is controlled. The head unit 113 controls the timing of adhesion of each ink composition, the dot size, and the like. In addition, an adhesion amount of the white ink composition or the non-white ink composition per scanning is controlled by the combination of control of the carriage unit 112 and the head unit 113.

A drying unit 114 (DU) controls temperatures of various heaters such as the IR heater 3, the preheater 7, the platen heater 4, and the heater 5.

The recording apparatus 1 alternately repeats the operation of moving the carriage 9 on which the recording head 2 is mounted in the main scanning direction and the transport operation, which is sub-scanning. At this time, when performing each pass, the control portion CONT controls the carriage unit 112 to move the recording head 2 in the main scanning direction, controls the head unit 113, ejects liquid droplets of the white ink composition or the non-white ink composition from predetermined nozzle holes of the recording head 2, and adheres the liquid droplets of the white ink composition or the non-white ink composition to the recording medium M. In addition, the control portion CONT controls the transport unit 111 to transport the recording medium M in the transport direction in a predetermined transport amount, or feed amount, during the transport operation.

In the recording apparatus 1, the recording region to which a plurality of liquid droplets is adhered is gradually transported by repeating the main scanning (pass) and the sub-scanning (transport operation). Then, the liquid droplets adhered to the recording medium M are dried by the heater 5 to complete an image. After that, the completed recorded object may be wound into a roll by a winding mechanism or transported by a flatbed mechanism.

1.5.3. Modified Example

A modified example of the recording apparatus in which the recording method according to the present embodiment is performed will be described below.

1.5.3.1. Modified Example of Arrangement of Nozzle Surface

In the recording method according to the present embodiment, the white ink adhesion step and the non-white ink adhesion step described above may be performed by the same relative scanning on the same scanning region of the recording medium. Therefore, the recording head 2 may be controlled to record by using a nozzle row configured of a part of the nozzles in each nozzle row. That is, each nozzle row may be selected to have an ejection nozzle row and a non-ejection nozzle row, respectively.

Such selection can be made, for example, by a user inputting the selection result into the control portion CONT. In addition, a menu relating to the arrangement of the ejection nozzle row and the non-ejection nozzle row of each nozzle row may be stored in the memory 103 or the like in advance, and the user may select the menu. Hereinafter, a set of nozzles used for recording in each nozzle row is referred to as an ejection nozzle row. In addition, a set of nozzles not used for recording in each nozzle row is referred to as a non-ejection nozzle row. The ejection nozzle row is a set of nozzles used for recording and set to perform ejection when recording, and in the case of such a nozzle, a nozzle that has an ejection failure due to an unintended malfunction of the nozzle during recording is also included in the ejection nozzle row. In addition, the non-ejection nozzle row is a set of nozzles used for recording and set so as not to perform ejection during recording, and in the case of such a nozzle, a nozzle that performs ejection for purposes other than image formation such as purpose of maintenance is also included in the non-ejection nozzle row.

When two or more ejection nozzle rows with different nozzle rows are arranged with perfect overlap when projected onto the main scanning direction MS, the liquid ejected from each nozzle row can be simultaneously sprayed onto the same scanning region in one time of pass. That is, with such an arrangement, the white ink adhesion step and the non-white ink adhesion step can be performed on the same scanning region of the recording medium by the same relative scanning.

Figure 6:
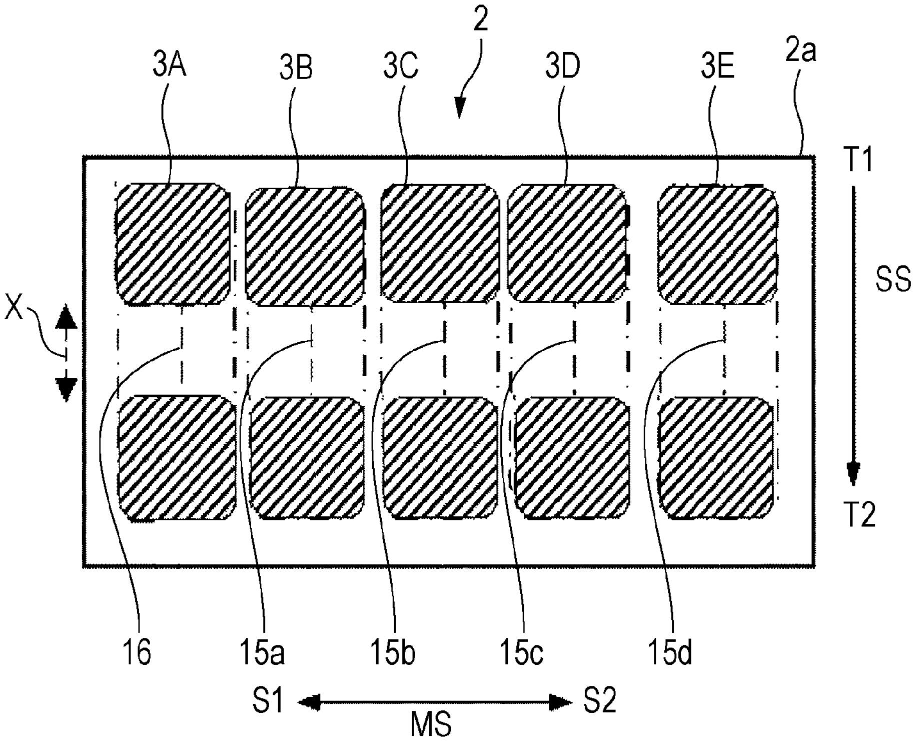
FIG. 6 is a schematic plan view schematically showing another example of arrangement of ejection nozzle rows in the recording head of an example of the recording apparatus used in the recording method according to the embodiment.

For example, FIG. 6 is an example in which one third of the white ink nozzle row 16 and the non-white ink nozzle rows 15*a* to 15*d* on the upstream in the sub-scanning direction and one third thereof on the downstream in the sub-scanning direction are set as non-ejection nozzle rows, in an example of the arrangement of the nozzle rows shown in FIG. 4. The nozzle rows are set as ejection nozzle rows in which diagonally shaded portions on the upstream and downstream in the sub-scanning direction are not used for recording, and the midstream without diagonal lines is used for recording, among the white ink nozzle rows 16 and the non-white ink nozzle rows 15*a* to 15*d*. The portion of the white ink ejection nozzle row and the non-white ink ejection nozzle row, which completely overlaps in the sub-scanning direction, is X. In a case of this method, the overlapping portion of the white ink nozzle row 16 and the non-white ink nozzle rows 15*a* to 15*d* is 100%, but the overlapping portion of the actually used white ink ejection nozzle row and the non-white ink ejection nozzle row is one third of the white ink ejection nozzle row and one third of the non-white ink ejection row. The example of FIG. 6 is the same as that of FIG. 4 except for this. Even in such an aspect, the white ink adhesion step and the non-white ink adhesion step can be performed by the same relative scanning on the same scanning region of the recording medium.

Figure 7:
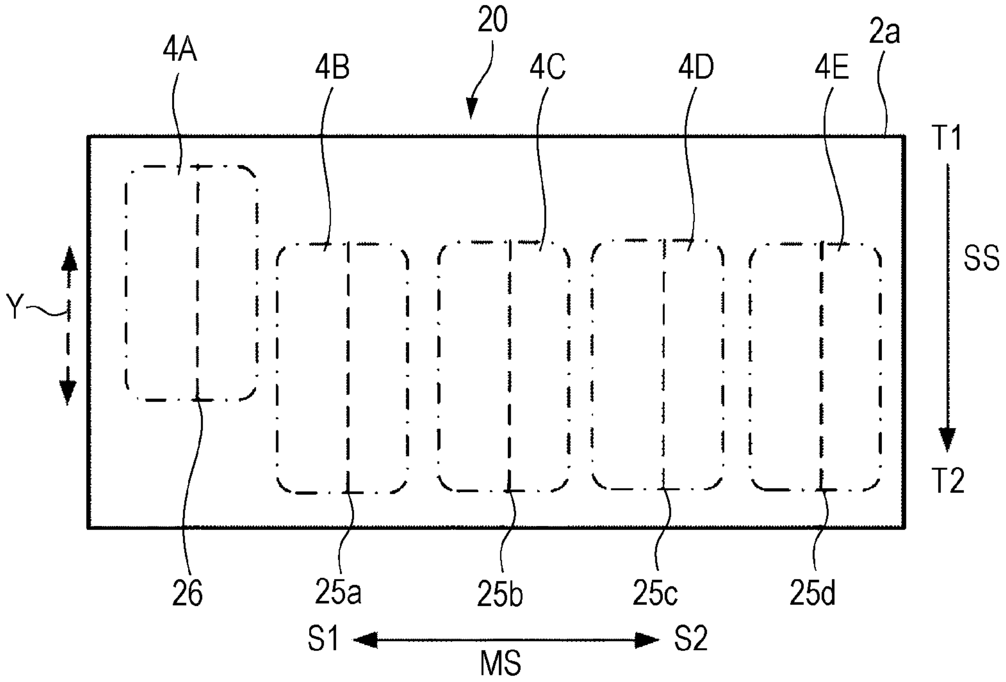
FIG. 7 is a schematic plan view schematically showing another example of arrangement of nozzle rows in a recording head of an example of the recording apparatus used in the recording method according to the embodiment.

In addition, FIG. 7 schematically shows another example of the arrangement of the nozzle rows. In the example shown in FIG. 7, a nozzle surface 20*a* of the recording head 20 has a plurality of non-white ink nozzle rows 25*a* to 25*d* in which a plurality of nozzles filled with the non-white ink composition are arranged in the sub-scanning direction, and a white ink nozzle row 26 in which a plurality of nozzles filled with the white ink composition is arranged in the sub-scanning direction. The white ink nozzle row 26 has a portion that overlaps with the non-white ink nozzle rows 25*a* to 25*d* in the sub-scanning direction. Here, the overlapping portion is a range indicated by Y in FIG. 7, and refers to a length in the sub-scanning direction indicated by Y, which coincides with a region 4A in which the white ink nozzle row 26 is present and regions 4B to 4E in which the non-white ink nozzle rows 25*a* to 25*d* are present.

In the example shown in FIG. 7, the overlapping portion Y is two thirds of the length of the white ink nozzle row 26 in the sub-scanning direction, and two thirds of the length of the non-white ink nozzle rows 25*a* to 25*d* in the sub-scanning direction. Even in such an arrangement of nozzle rows, the overlapping portion Y can be at least an ejection nozzle row, and the same relative scanning can be performed on the same scanning region of the recording medium.

Only the overlapping portion Y may be used as the ejection nozzle row, or the portion of the nozzle row other than the overlapping portion Y, that is, the portion upstream or downstream of the overlapping portion Y in the SS direction, may be also used as the ejection nozzle row. That is, the overlapping portion Y may at least have a scanning region so that the white ink adhesion step and the non-white ink adhesion step are performed by the same relative scanning on the same scanning region of the recording medium.

In this way, the white ink adhesion step and the non-white ink adhesion step can be performed by the same relative scanning on the same scanning region of the recording medium.

Figure 8:
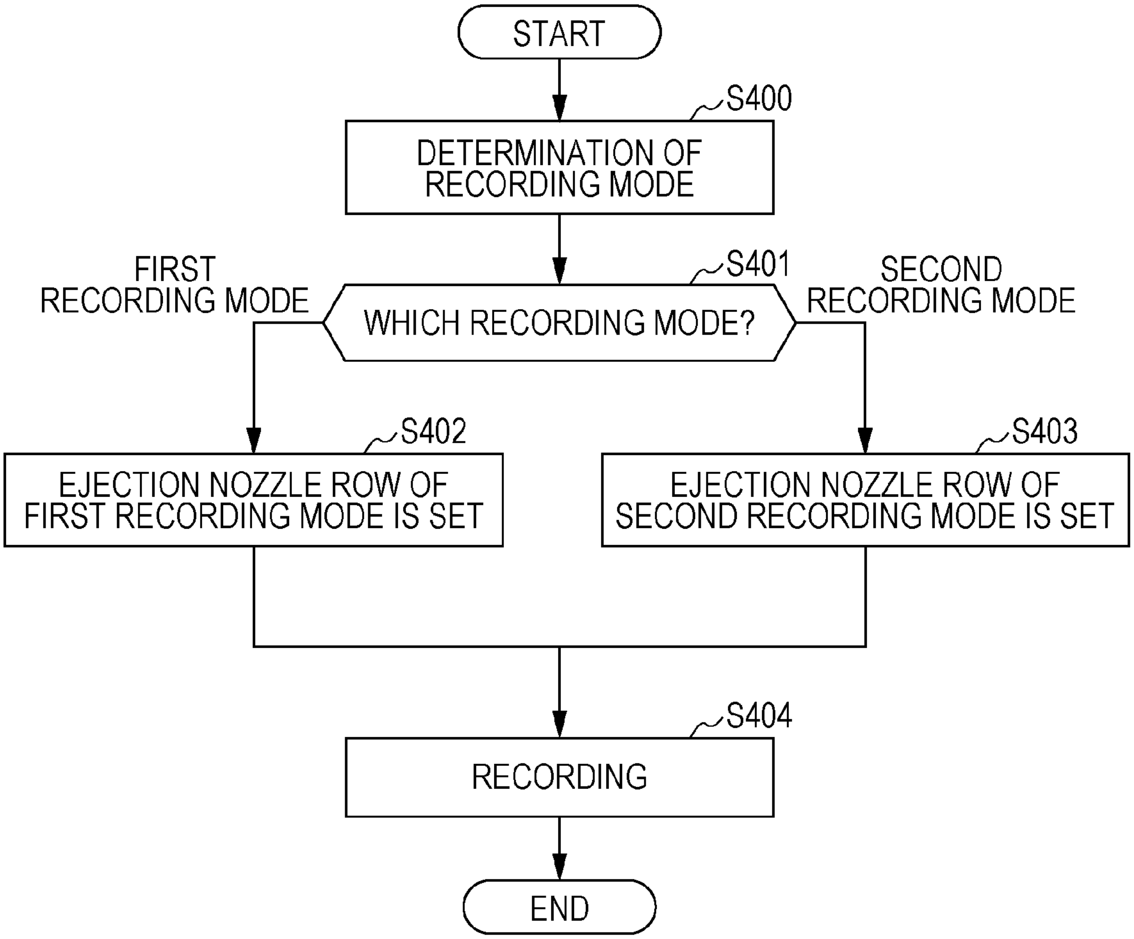
FIG. 8 is a flowchart showing an example of processing performed when recording is performed by the recording apparatus used in the recording method according to the embodiment.

FIG. 8 is an example of a flowchart showing a processing performed when recording is performed by the recording apparatus 1. When starting recording, a control portion of the recording apparatus performs determination of a recording mode in step S400. The recording mode is an aspect of recording in which details of recording such as arrangement of the ejection nozzle row or non-ejection nozzle row used in recording, an ejection amount, overlapping aspect, operation of recording head during recording, and operation of recording medium are determined.

The recording mode is determined by an input signal input to the recording apparatus 1 from an external device such as a computer, or determined by a user's input information to a user input portion included in the recording apparatus 1. Here, the input signal from the external device or the input information of the user may be information for directly designating the recording mode, or may be information relating to recording such as recording medium type information to be recorded, designation of recording speed, designation of image quality, and the like. In addition, information relating to recording is not limited thereto. In the latter case, the recording apparatus 1 records corresponding information in which the recording mode corresponding to the information related to the recording is determined in advance in the recording apparatus 1 such as the control portion, and determines the recording mode with reference to the corresponding information. Alternatively, determination may be performed using AI technology, which is artificial intelligence technology.

In step S401, the determined recording mode is identified. In step S402 or S403, an ejection nozzle row is set depending on the determined recording mode. Recording is performed in step S404. In the figure, two types of recording modes of a first recording mode and a second recording mode are shown, but there may be three or more.

In the case of this example, the recording apparatus 1 is preferable since the arrangement of the ejection nozzle rows can differ depending on the recording mode and various recordings can be performed.

1.5.3.2. Modified Example of Recording Head

The recording apparatus of FIG. 2 is a serial type recording apparatus equipped with a serial type recording head and performing a serial type recording method. On the other hand, the recording head 2 may be a line type recording head. Even in the line type recording head, scanning can be relatively performed with respect to the recording medium M. Then, according to the recording method according to the present embodiment, even when an adhesion amount of the white ink composition is relatively small, an image excellent in image quality can be formed.

In FIG. 1, when the recording head 2 is a line type recording head, in the line type recording head, a region of the nozzle formed in a direction intersecting the arrow SS direction, which is a transport direction of the recording medium M is provided to cover the entire intersecting direction of the recording medium M. Then, without performing movement of the line type recording head in the direction intersecting the arrow SS direction which is the transport direction of the recording medium M, recording operation, or scanning, is performed while performing transport of the recording medium M in the SS direction. In this way, when the recording head 2 is a line type recording head, the recording apparatus 1 performs recording by ejecting the white ink composition and the non-white ink composition from the line type recording head and adhering the white ink composition and the non-white ink composition to the recording medium M while moving a relative position of the line type recording head and the recording medium M. The number of times of scanning is 1.

The line type recording head has a nozzle surface including a plurality of nozzle rows that eject a white ink composition or a non-white ink composition, but the arrangement of the nozzle rows is not particularly limited, and the white ink adhesion step and the non-white ink adhesion step may be performed by the same relative scanning on the same scanning region of the recording medium.

1.5.3.3. Modified Example of Carriage Moving Mechanism

In the recording apparatus 1 as shown in FIG. 2, the main scanning of the recording head 2 and the sub-scanning which is the transport of the recording medium M are repeated a plurality of times to perform recording on the recording medium M. On the other hand, a lateral scanning method may be used in which an image is printed only by moving the recording head 2 in a certain print region on the recording medium M without transporting the recording medium M. Even in such a lateral scanning method, the white ink adhesion step and the non-white ink adhesion step can be performed by the same relative scanning on the same scanning region of the recording medium.

Figure 9:
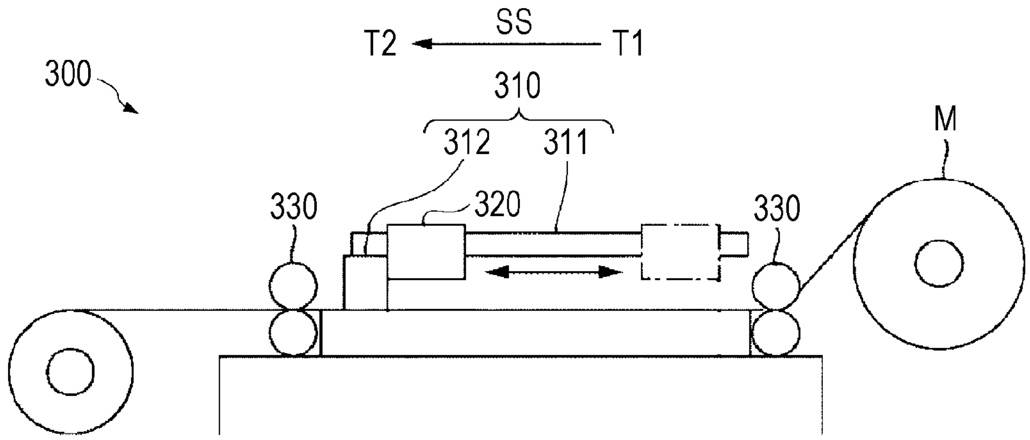
FIG. 9 is a schematic side view schematically showing a part of a recording apparatus that performs recording by a lateral scan method.
Figure 10:
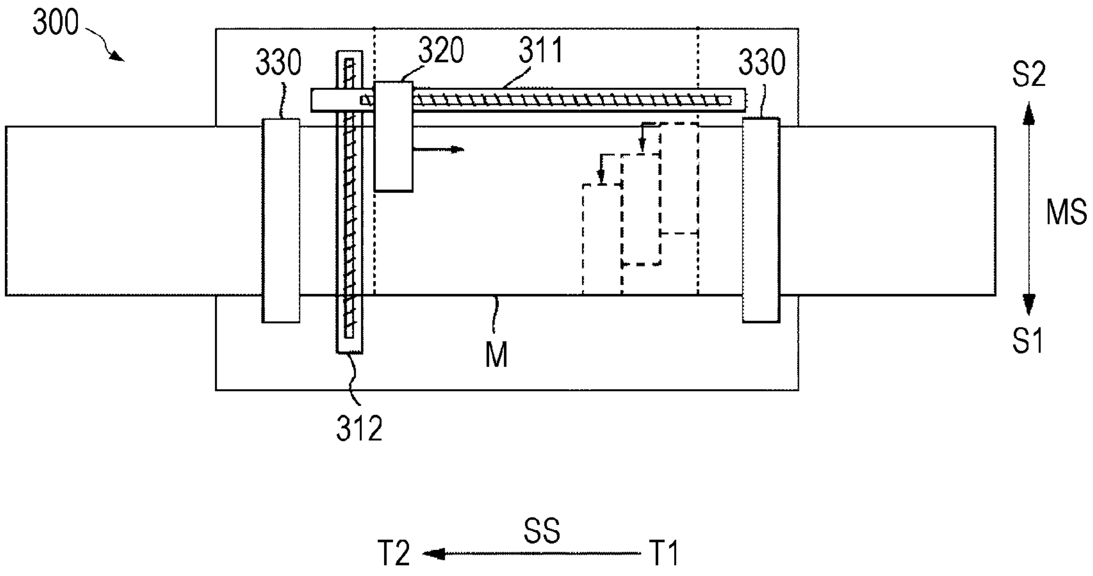
FIG. 10 is a schematic bird's-eye view schematically showing a part of a recording apparatus that performs recording by a lateral scan method.

FIG. 9 is a schematic side view schematically showing a part of a recording apparatus that performs recording by a lateral scanning method. FIG. 10 is a schematic bird's-eye view schematically showing a part of a recording apparatus that performs recording by a lateral scanning method. A part 300 of the recording apparatus includes a carriage moving mechanism 310 including a main scanning shaft carriage moving mechanism 312 and a sub-scanning shaft carriage moving mechanism 311, a carriage 320 including a recording head 2, and a transport roller 330 that transports the recording medium M.

The carriage moving mechanism 310 freely moves the carriage 320 including the recording head 2 not shown in the figure in a sub-scanning direction SS corresponding to the transport direction of the recording medium M and a main scanning direction MS corresponding to a direction orthogonal to the transport direction of the recording medium M. The carriage moving mechanism 310 includes the sub-scanning shaft carriage moving mechanism 311 that moves the carriage 320 in the sub-scanning direction MS, the main scanning shaft carriage moving mechanism 312 that moves the sub-scanning shaft carriage moving mechanism 311 in the main scanning direction MS, and a motor, not shown in the figure, that moves these.

The carriage 320 is provided in the sub-scanning shaft carriage moving mechanism 311, and when the sub-scanning shaft carriage moving mechanism 311 performs a moving operation in the sub-scanning direction SS, the carriage 320 also moves in the sub-scanning direction SS. In addition, when the main scanning shaft carriage moving mechanism 312 performs a moving operation in the main scanning direction MS, the carriage 320 also moves in the main scanning direction MS. Then, by moving the carriage 320 in the sub-scanning direction SS and also moving thereof in the main scanning direction MS, the carriage 320 can be moved in a direction oblique to the sub-scanning direction SS. By intermittently ejecting the ink composition from the nozzle while the carriage 320 is moving, the white ink composition and the non-white ink composition can be adhered to the recording medium M along the oblique direction. After that, the carriage 320 is moved by the main scanning shaft carriage moving mechanism 312 in the main scanning direction MS through the sub-scanning shaft carriage moving mechanism 311 and performs printing while the carriage 320 is moving in the oblique direction again.

In this way, by repeating the operation of adhering the white ink composition and the non-white ink composition on the recording medium M by moving the carriage 320 and the movement of the carriage 320 in the main scanning direction MS, an image can be printed on the recording medium in the print region. An operation of printing an image on the recording medium M supplied to the print region, which is image forming operation, and an operation of transporting the recording medium M in the transport direction by the transport roller 330 and supplying a new recording medium M portion to the print region, which is transport operation, are alternately repeated to print a large number of images on the continuous recording medium M.

The carriage 320 can be optionally moved, and without operation of the sub-scanning shaft carriage moving mechanism 311, only the operation of the main scanning shaft carriage moving mechanism 312 that moves the carriage 320 in the main scanning direction MS of the recording medium M may perform relative scanning of the carriage 320 and the recording medium M. Then, after the carriage 320 finishes operation in the main scanning direction MS of the recording medium M, an operation of moving the carriage 320 in the sub-scanning direction SS is performed by the sub-scanning shaft carriage moving mechanism 311. That is, the sub-scanning shaft carriage moving mechanism 311 and the main scanning shaft carriage moving mechanism 312 may be operated independently to perform recording on the recording medium M. In addition, both unidirectional printing and bidirectional printing may be used, and multipass recording may be performed.

1.6. Other Steps

The recording method according to the present embodiment may include a drying step of drying a liquid adhered to a recording medium, a step of heating the recording medium, or post-heating step, and the like.

1.6.1. Drying Step

The recording method according to the present embodiment may include a drying step. The recording method according to the present embodiment may include a step of drying the recording medium before or during the adhesion step of the white ink composition and the non-white ink composition. The drying step can be performed by a unit that stops recording and leaves the recording medium to stand, or by a unit that performs drying using a drying mechanism. Examples of the unit that performs drying using a drying mechanism include a unit that performs normal temperature ventilation or warm temperature ventilation to the recording medium, which is a ventilation type, a unit that irradiates the recording medium with radiation, for example, infrared rays, that generates heat on the recording medium, which is a radiation type, a member that is in contact with a recording medium and conducts heat to the recording medium, which is a conduction type, a combination of two or more of these units, and the like. When the drying step is provided, among these, the conduction type or the ventilation type may be preferably performed.

A surface temperature of the recording medium at a time of adhesion of the white ink composition and the non-white ink composition is preferably 60° C. or lower, and more preferably 50° C. or lower. In addition, 45° C. or lower is preferable, and 40° C. or lower is preferable. On the other hand, 20° C. or higher is preferable, and 20° C. to 60° C. is more preferable. In addition, 27° C. or higher is preferable, 28° C. or higher is more preferable, 30° C. or higher is further more preferable, 32° C. or higher is particularly preferable, 40° C. or higher is particularly more preferable, and 45° C. or higher is more preferable. The temperature is a surface temperature of the portion of the recording surface of the recording medium, on which the ink composition is adhered in the adhesion step, and is a highest temperature of the adhesion step in the recording region. When the surface temperature is in the above range, the surface temperature is more preferably from a viewpoint of image quality, abrasion resistance, reduction of clogging, and high gloss.

The drying step can also be performed simultaneously with the white ink adhesion step and the non-white ink adhesion step described above. When the ink is adhered, the surface temperature of the recording medium is preferably 43° C. or lower, more preferably 40° C. or lower.

When the drying step of drying the recording medium is performed before the white ink adhesion step and the non-white ink adhesion step or during the white ink adhesion step and the non-white ink adhesion step, the surface temperature of the recording medium at a time point when the white ink composition and the non-white ink composition are adhered to the recording medium is 30.0° C. or higher, preferably 35.0° C. or higher, and more preferably 40.0° C. or higher. By doing so, when the white ink composition and the non-white ink composition contain resin particles, a film is likely to be formed, and thus the adhesion properties and abrasion resistance of the obtained image can be further improved in some cases.

1.6.2. Post-Heating Step

The recording method according to the present embodiment may further include a post-heating step of heating the recording medium after each of the above-described adhesion steps. The post-heating step can be performed, for example, by using an appropriate heating unit. The post-heating step is performed by, for example, an after-heater corresponding to the heater 5 in the above-described example of the recording apparatus. In addition, the heating unit is not limited to the heating unit provided in the recording apparatus, and other drying units may be used. With this, the obtained image can be dried and more sufficiently fixed, and thus, for example, the recorded object can be used in a state of being used at an early stage.

A temperature of the recording medium in this case is not particularly limited, but may be set in consideration of Tg of the resin component constituting the resin particles contained in the recorded object and the like, for example. When considering the Tg of the resin component constituting the resin particles or wax, the Tg may be set to be 5.0° C. or higher, and preferably set to be 10.0° C. or higher than the Tg of the resin component constituting the resin particles.

The surface temperature of the recording medium reached by heating in the post-heating step is 30.0° C. or higher and 120.0° C. or lower, preferably 40.0° C. or higher and 100.0° C. or lower, more preferably 50.0° C. or higher and 95° C. or lower, and further more preferably 70° C. or higher and 90° C. or lower. The surface temperature of the recording medium reached by heating in the post-heating step is particularly preferably 80° C. or higher. When the temperature of the recording medium is in this range, the resin particles or wax contained in the recorded object can be filmed and flattened, and the obtained image can be dried and more sufficiently fixed.

2. RECORDING APPARATUS

The recording apparatus according to an embodiment of the present disclosure is a recording apparatus that performs recording on a recording medium, includes a white ink head that adheres a white ink composition containing a white color material to the recording medium, a non-white ink head that adheres a non-white ink composition including a non-white color material to the recording medium, and a scanning mechanism that performs relative scanning of the ink head and the recording medium, and performs recording by the recording method described above. According to such a recording apparatus, both formation of an image excellent in image quality and excellent printing speed can be achieved. In addition, when the recording head is a serial type, nozzle rows to be used may be arranged so that at least a part thereof overlap when projected in a main scanning direction. Therefore, a length of the recording head in a sub-scanning direction can be shortened, and as a result, the entire device can be miniaturized.

As the recording apparatus according to the present embodiment, the recording apparatus as shown in FIGS. 1 to 10 described above can be used.

The "white ink head" refers to a portion of the recording head 2 having the white ink nozzle row 16 in FIG. 4. In addition, the "non-white ink head" refers to a portion of the recording head 2 having the non-white ink nozzle rows 15*a* to 15*d* in FIG. 4. The "ink head" is a recording head encompassing a white ink head and a non-white ink head, and is shown as the recording head 2 in FIG. 2. In addition, the "scanning mechanism" is a combination of the carriage moving mechanism 13 and the transport unit 14 in FIG. 2.

3. EXAMPLE

Hereinafter, the present disclosure will be described in more detail with reference to examples, but the present disclosure is not limited to these examples. Hereinafter, "%" is based on mass unless otherwise specified.

3.1. Preparation of White Ink Composition and Non-White Ink Composition

Each component was mixed in the content shown in Tables 1 and 2 below, stirred at room temperature for 2 hours, and then filtered through a membrane filter having a pore size of 10 μm to obtain each of a white ink composition and a non-white ink composition.

The unit of the content of the white ink composition and the non-white ink composition shown in Tables 1 and 2 below is mass %, and the contents of the color material, the resin and the wax represent the solid content conversion amount. In addition, ion-exchanged water was added so that the total mass of the composition was 100% by mass.

As the color material used for preparing the ink composition, a color material dispersion was prepared in advance as follows, and this was used for preparing the ink composition.

Preparation of White Color Material Dispersion

First, to 155 parts by mass of ion-exchanged water in which 0.1 part by mass of a 30% aqueous ammonia solution, being neutralizing agent, was dissolved, 4 parts by mass of an acrylic acid-acrylic acid ester copolymer, with weight average molecular weight: 25,000, acid value: 18, was added as a resin dispersant and dissolved. To this, 40 parts by mass of titanium dioxide (C.I. Pigment White 6), which is a white color material, was added, and a ball mill using zirconia beads was used for dispersion processing for 10 hours. Thereafter, centrifugal filtration was performed with a centrifuge, impurities such as coarse particles and dusts were removed, and a concentration of a white color material was adjusted to be 20% by mass to obtain a white color material dispersion. As for the particle size of the white color material, an average particle size was 350 nm.

Preparation of Non-White Color Material Dispersion

First, to 160.5 parts by mass of ion-exchanged water in which 2 parts by mass of a 30% aqueous ammonia solution, being neutralizing agent, was dissolved, 7.5 parts by mass of an acrylic acid-acrylic acid ester copolymer, with weight average molecular weight: 25,000, acid value: 180, was added as a resin dispersant and dissolved. To this, 30 parts by mass of C.I. Pigment Red 122 as a magenta color material was added, and a ball mill using zirconia beads was used for dispersion processing for 10 hours. Thereafter, centrifugal filtration was performed with a centrifuge, impurities such as coarse particles and dusts were removed, and a concentration of the magenta color material was adjusted to be 15% by mass to obtain a non-white color material dispersion, which is a magenta color material dispersion. As for the particle size of the magenta color material at this time an average particle size was 100 nm.

TABLE 1

| Composition | | White ink composition | | | | | | | |
|---|---|---|---|---|---|---|---|---|---|
| | | W01 | W02 | W03 | W04 | W05 | W06 | W07 | W08 |
| White color material | Titanium dioxide | 10 | 10 | 10 | 10 | 10 | 10 | 10 | 10 |
| Non-white color material | Magenta | | | | | | | | |
| Resin | Styrene/acrylic | 5 | 5 | 5 | 5 | 5 | 5 | 5 | 5 |
| Wax | Polyethylene-based | 2 | 2 | 2 | 2 | 2 | 2 | 2 | 2 |
| Nitrogen-containing solvent | 2-pyrrolidone | 8 | 8 | 4 | 2 | 10 | 12 | 6 | 4 |
| | 3-methoxy-N,N-dimethylpropaneamide | | | | | | | | |
| Other organic solvent | Glycerol | | 1 | | | | | | |
| | Propylene glycol | 12 | 12 | 16 | 18 | 10 | 8 | 10 | 8 |
| Surfactant | BYK348 | 1 | 1 | 1 | 1 | 1 | 1 | 1 | 1 |
| Water | Ion-exchanged water | Residue | Residue | Residue | Residue | Residue | Residue | Residue | Residue |
| Total | | 100 | 100 | 100 | 100 | 100 | 100 | 100 | 100 |
| Total amount of organic solvent | | 20 | 21 | 20 | 20 | 20 | 20 | 16 | 12 |
| Nitrogen-containing solvent ratio (to total amount of organic solvent %) | | 40 | 38 | 20 | 10 | 50 | 60 | 38 | 33 |
| Ink precipitation recoverability | | A | A | A | A | A | A | B | C |

TABLE 2

| Composition | | White ink composition | | | Non-white ink composition | | | | | |
|---|---|---|---|---|---|---|---|---|---|---|
| | | W09 | W10 | W11 | M01 | M02 | M03 | M04 | M05 | M06 |
| White color material | Titanium dioxide | 10 | 10 | 10 | | | | | | |
| Non-white color material | Magenta | | | | 4 | 4 | 4 | 4 | 4 | 4 |

TABLE 2-continued

| | | White ink composition | | | Non-white ink composition | | | | | |
|---|---|---|---|---|---|---|---|---|---|---|
| Composition | | W09 | W10 | W11 | M01 | M02 | M03 | M04 | M05 | M06 |
| Resin | Styrene/acrylic | 5 | 5 | 5 | 3 | 3 | 3 | 3 | 3 | 3 |
| Wax | Polyethylene-based | 2 | 2 | 2 | 1 | 1 | 1 | 1 | 1 | 1 |
| Nitrogen-containing solvent | 2-pyrrolidone | 13 | | | 13 | 10 | 7 | 4 | | |
| | 3-methoxy-N,N-dimethylpropaneamide | | | 8 | | | | | | 13 |
| Other organic solvent | Glycerol | | | | | | | | | |
| | Propylene glycol | 19 | 20 | 12 | 12 | 15 | 18 | 21 | 25 | 12 |
| Surfactant | BYK348 | 1 | 1 | 1 | 1 | 1 | 1 | 1 | 1 | 1 |
| Water | Ion-exchanged water | Residue | Residue | Residue | Residue | Residue | Residue | Residue | Residue | Residue |
| Total | | 100 | 100 | 100 | 100 | 100 | 100 | 100 | 100 | 100 |
| Total amount of organic solvent | | 32 | 20 | 20 | 25 | 25 | 25 | 25 | 25 | 25 |
| Nitrogen-containing solvent ratio (to total amount of organic solvent %) | | 41 | 0 | 40 | 52 | 40 | 28 | 16 | 0 | 52 |
| Ink precipitation recoverability | | A | A | A | — | — | — | — | — | — |

The explanation was supplemented for each component shown in Tables 1 and 2 above.

Color Material

Titanium dioxide, which is a white color material: C.I. Pigment White 6

Magenta, which is a non-white color material: C.I. Pigment Red 122

Resin

Styrene/acrylic: Product name "Joncryl 62J", manufactured by BASF Japan Ltd.

Wax

Polyethylene-based: Product name "AQUACER539", manufactured by BYK

Surfactant

BYK348: Product name manufactured by BYK Chemie Japan Co., Ltd., silicone-based surfactant 3.2. Evaluation Method 3.2.1. Recording Test Each white ink composition and each non-white ink composition obtained above were filled in an ink cartridge and mounted on a recording apparatus. As the recording apparatus, "SC-S40650" manufactured by Seiko Epson Corporation was modified and used. In addition, the recording apparatus performed recording by a plurality of times of main scanning in which the recording head moves in the main scanning direction and a plurality of times of sub-scanning in which the recording medium moves in the sub-scanning direction. The recording head was configured as shown in FIG. 4, and had a white ink nozzle row, which is a white ink nozzle row 16, in which nozzles are arranged in the sub-scanning direction and ejects the white ink composition, and non-white ink nozzle rows, which are non-white ink nozzle rows 15*a* to 15*d*, in which the nozzles are arranged in the sub-scanning direction and ejects the non-white ink composition. In this case, the white ink nozzle row was arranged such that a portion in which the white ink nozzle row overlaps with the non-white ink nozzle row in the sub-scanning direction was 100%.

In any recording apparatus, the ventilation fan and the IR heater shown in FIG. 1 were provided above the recording head, and the platen heater was provided below the recording head.

The following two types of printing methods were used.

Printing Method 1: Simultaneous Printing

The recording head was configured as shown in FIG. 4, and the entire white ink nozzle row was used for recording as the ejection nozzle row of the white ink composition, and the entire non-white ink nozzle row was used for recording as the ejection nozzle row of the non-white ink composition. The method is a printing method in which the white ink composition and the non-white ink composition are simultaneously ejected during scanning of the recording head, both the white ink composition and the non-white ink composition adhering in one pass), and all the nozzles of the white ink nozzle row and the non-white ink nozzle row are the ejection nozzle rows. In Tables 3 and 4, "simultaneous" is described as a simultaneous printing method.

Printing Method 2: Pre-Printing

Only the white ink nozzle row was used for recording as the white ink composition ejection nozzle row, after adhesion of the white ink, the recording medium was returned, and only the non-white ink nozzle row was used for recording as the non-white ink composition ejection nozzle row. A pattern made of non-white ink was superposed and adhered to a pattern made of white ink adhered in advance. That is, this is a printing method in which after the scanning in which adhesion of the white ink composition of the recording head is performed, scanning of performing adhesion of the non-white ink composition is performed on a region to which the white ink composition is adhered, and does not have an overlapping portion when projecting each ejection nozzle row in the main scanning direction. In Tables 3 and 4 below, "pre-printing" is described as the pre-printing method.

In addition, the following two types of scanning methods were used.

Scanning Method 1: Bidirectional Printing

A printing method in which in one time of operation, which is also referred to as "pass", of forming an image while moving the recording head in the main scanning direction, the moving directions of the recording head in the main scanning direction are different between pass 1 and pass 2. In Table 3 and Table 4 below, "bidirectional" is described as bidirectional printing.

Scanning Method 2: Unidirectional Printing

A printing method in which the moving directions of the recording head in the main scanning direction are the same in pass 1 and pass 2. In Table 3 and Table 4 below, "unidirectional" is described as unidirectional printing. The white ink nozzle row in the recording head was arranged ahead of the non-white ink nozzle row in the main scanning direction of the pass.

An interval between adjacent nozzles in the nozzle row in the row direction was 360 dpi, and the number of nozzles was 360. For the white ink composition and the non-white ink composition, the ink droplet mass or the number of ink droplets ejected were adjusted so that the adhesion amount in the recording pattern was the adhesion amount in Tables 3 and 4 below. A recording pattern of 5×5 cm was recorded.

In addition, in simultaneous printing, which is printing method 1, 4 pass recording was used. That is, the distance of one time of sub-scanning was set to about a quarter of the length of the ejection nozzle row in the sub-scanning direction so that adhesion was performed in a certain region of the recording medium in four passes.

In the pre-printing, which is printing method 2, 4 passes were used for the white ink composition and 4 passes were used for the non-white ink composition.

As the recording medium, a transparent PET medium (manufactured by Lintec Corporation, product name "E1000ZC") was used. The platen heater was controlled so that the recording medium was in a state of being heated while the platen heater was in a state of operation. The surface temperature of the recording medium in each example was measured and described in Tables 3 and 4 below as the "primary heating temperature".

When the drying unit was performed after the adhesion step, "Present" was described in the table of each example, and when the drying unit was not performed after the adhesion step, "Absent" was described. As the drying unit, both the ventilation type and the conduction type were used in combination, and "platen ventilation" was described in the table. The wind speed of the ventilation type was set to 2 m/s on the recording medium. A platen heater was used for the conduction type. For the ventilation type, a ventilation fan was used, and normal temperature air of 25° C. was applied to the recording medium.

The drying step which is a secondary drying step after the adhesion step was performed so that the surface temperature of the recording medium was 70° C.

TABLE 3

| | Examples | | | | | | | |
|---|---|---|---|---|---|---|---|---|
| | Example 1 | Example 2 | Example 3 | Example 4 | Example 5 | Example 6 | Example 7 | Example 8 |
| White ink composition | W01 | W01 | W01 | W01 | W01 | W01 | W01 | W10 |
| Adhesion amount mg/inch$^2$ | 0.8 | 1.2 | 2.4 | 3.6 | 0.6 | 1.2 | 6 | 0.8 |
| Non-white ink composition | M01 | M01 | M01 | M01 | M01 | M01 | M01 | M05 |
| Adhesion amount mg/inch$^2$ | 7.2 | 7.2 | 7.2 | 7.2 | 1.2 | 2.4 | 12 | 7.2 |
| Color/white printing method | Simultaneous | Simultaneous | Simultaneous | Simultaneous | Simultaneous | Simultaneous | Simultaneous | Simultaneous |
| Adhesion amount ratio (white/non-white) | 11% | 17% | 33% | 50% | 50% | 50% | 50% | 11% |
| Platen ventilation | Present | Present | Present | Present | Present | Present | Present | Present |
| Primary heating temperature (° C.) | 45 | 45 | 45 | 45 | 45 | 45 | 45 | 45 |
| Scanning method | Bidirectional | Bidirectional | Bidirectional | Bidirectional | Bidirectional | Bidirectional | Bidirectional | Bidirectional |
| Image quality (ratio OD value) | A | A | B | B | A | B | C | A |
| Ratio abrasion resistance | A | B | C | D | B | B | D | D |
| Printing speed ratio | A | A | A | A | A | A | A | A |

| | Examples | | | | | | | |
|---|---|---|---|---|---|---|---|---|
| | Example 9 | Example 10 | Example 11 | Example 12 | Example 13 | Example 14 | Example 15 | Example 16 |
| White ink composition | W11 | W01 | W01 | W03 | W04 | W01 | W02 | W01 |
| Adhesion amount mg/inch$^2$ | 1.2 | 1.2 | 0.8 | 0.8 | 0.8 | 0.6 | 0.8 | 6.7 |
| Non-white ink composition | M06 | M01 | M02 | M03 | M04 | M01 | M01 | M01 |

TABLE 3-continued

| | | | | | | | | |
|---|---|---|---|---|---|---|---|---|
| Adhesion amount mg/inch$^2$ | 7.2 | 8.2 | 7.2 | 7.2 | 7.2 | 7.2 | 7.2 | 12 |
| Color/white printing method | Simultaneous | Simultaneous | Simultaneous | Simultaneous | Simultaneous | Simultaneous | Simultaneous | Simultaneous |
| Adhesion amount ratio (white/non-white) | 17% | 15% | 11% | 11% | 11% | 8% | 11% | 56% |
| Platen ventilation | Present | Present | Present | Present | Present | Present | Present | Present |
| Primary heating temperature (° C.) | 45 | 45 | 45 | 45 | 45 | 45 | 45 | 45 |
| Scanning method | Bidirectional | Bidirectional | Bidirectional | Bidirectional | Bidirectional | Bidirectional | Bidirectional | Bidirectional |
| Image quality (ratio OD value) | B | B | B | B | A | C | A | C |
| Ratio abrasion resistance | A | A | A | A | A | A | D | B |
| Printing speed ratio | A | A | A | A | A | A | A | A |

TABLE 4

| | Examples | | | | | | | |
|---|---|---|---|---|---|---|---|---|
| | Example 17 | Example 18 | Example 19 | Example 20 | Example 21 | Example 22 | Example 23 | Example 24 |
| White ink compositen | W05 | W06 | W07 | W08 | W01 | W01 | W03 | W01 |
| Adhesion amount mg/inch$^2$ | 0.8 | 0.8 | 0.8 | 0.8 | 0.8 | 0.8 | 0.8 | 0.8 |
| Non-white ink composition | M01 | M01 | M01 | M01 | M02 | M03 | M04 | M01 |
| Adhesion amount mg/inch$^2$ | 7.2 | 7.2 | 7.2 | 7.2 | 7.2 | 7.2 | 7.2 | 7.2 |
| Color/white printing method | Simultaneous | Simultaneous | Simultaneous | Simultaneous | Simultaneous | Simultaneous | Simultaneous | Simultaneous |
| Adhesion amount ratio (white/non-white) | 11% | 11% | 11% | 11% | 11% | 11% | 11% | 11% |
| Platen ventilation | Present | Present | Present | Present | Present | Present | Present | Absent |
| Primary heating temperature (° C.) | 45 | 45 | 45 | 45 | 45 | 45 | 45 | 45 |
| Scanning method | Bidirectional | Bidirectional | Bidirectional | Bidirectional | Bidirectional | Bidirectional | Bidirectional | Bidirectional |
| Image quality (ratio OD value) | C | C | C | C | C | C | C | C |
| Ratio abrasion resistance | B | C | A | A | A | B | D | B |
| Printing speed ratio | A | A | A | A | A | A | A | A |

TABLE 4-continued

| | Examples | | | | Comparative Examples | | Reference Examples | |
|---|---|---|---|---|---|---|---|---|
| | Example 25 | Example 26 | Example 27 | Example 28 | Comparative Example 1 | Comparative Example 2 | Reference Example 1 | Reference Example 2 |
| White ink compositen | W01 | W01 | W09 | W01 | W01 | W01 | W01 | W01 |
| Adhesion amount mg/inch$^2$ | 0.8 | 0.8 | 0.8 | 6 | 8.4 | 4.7 | 0.8 | 6.7 |
| Non-white ink composition | M01 | M01 | M01 | M01 | M01 | M01 | M01 | M01 |
| Adhesion amount mg/inch$^2$ | 7.2 | 7.2 | 7.2 | 12 | 12 | 7.2 | 7.2 | 12 |
| Color/white printing method | Simultaneous | Simultaneous | Simultaneous | Simultaneous | Simultaneous | Simultaneous | Pre-emptive | Pre-emptive |
| Adhesion amount ratio (white/non-white) | 11% | 11% | 11% | 50% | 70% | 65% | 11% | 56% |
| Platen ventilation | Present | Present | Present | Present | Present | Present | Present | Present |
| Primary heating temperature (° C.) | 40 | 50 | 45 | 45 | 45 | 45 | 45 | 45 |
| Scanning method | Bidirectional | Bidirectional | Bidirectional | Unidirectional | Bidirectional | Bidirectional | Bidirectional | Bidirectional |
| Image quality (ratio OD value) | C | B | C | B | D | D | A | A |
| Ratio abrasion resistance | A | A | B | D | B | B | A | A |
| Printing speed ratio | A | A | A | B | A | A | C | C |

3.2.2. Evaluation of Ink Precipitation Recoverability

Only each white ink composition obtained as described above was filled in an ink cartridge, mounted on a recording apparatus, and then allowed to stand for 24 hours. Recording of an image was performed in the same manner as in Example 1 except that the non-white ink composition was not used and the adhesion amount of the white ink composition to the recording medium was 10.8 mg/inch$^2$. A whiteness, which is L value, of the image was measured by a spectrocolorimeter "i1pro2" (product name, manufactured by X-RITE), and was determined by the following evaluation criteria. As the measurement conditions, a light source was D50 and an observation angle was 2°. In addition, at a time of measurement, a black mount of ISO concealment cash chart (manufactured by Cotec, product name "KL-2A") was used as a base.

Evaluation Criteria

A: L value≥75

B: 75>L value≥70

C: 70>L value 3.2.3. Evaluation of Image Quality, which is a Specific OD Value

A reflection density, which is an OD value, of the recording pattern portion on a front side of each recorded object obtained in the above recording test was measured by a spectrocolorimeter "i1pro2" (product name, manufactured by X-RITE). As the measurement conditions, a light source was D50 and an observation angle was 2°. In each example and each comparative example, the same conditions were used except that the printing method was simultaneous printing or pre-printing, and a recorded recording pattern was prepared and measured in the same manner. Determination was performed by the following evaluation criteria from a ratio (specific OD value) of the measured OD values in each example, each comparative example, and each reference example to the OD value of the reference example recorded by the pre-printing method. Since the reference example is a pre-printing, and thus is set to 100%. The same applies to the following evaluation tests.

Evaluation Criteria

A: The specific OD value is 100% or more.

B: The specific OD value is 90% or more and less than 100%.

C: The specific OD value is 80% or more and less than 90%.

D: The specific OD value is less than 80%.

3.2.4. Evaluation of Specific Abrasion Resistance

A recording pattern portion of each recorded object obtained in the above recording test was rubbed back and forth 50 times with a friction element obtained by attaching a white cotton cloth, in accordance with JIS L 0803, to a vibration type friction fastness rubbing tester "AB-301" (product name manufactured by Tester Sangyo Co., Ltd), applying a load of 200 g. Then, a ratio, which is a peeling area ratio, of the peeling area in each example, each comparative example, and each reference example to the peeling area of a recording pattern recorded by a pre-printing method similar to the image quality evaluation was visually observed, and determined by the following evaluation criteria.

Evaluation Criteria

A: The peeling area ratio is 100% or more.

B: The peeling area ratio is 90% or more and less than 100%.

C: The peeling area ratio is 80% or more and less than 90%.

D: The peeling area ratio is 70% or more and less than 80%.

E: The peeling area ratio is less than 70%.

3.2.5. Evaluation of Printing Speed Ratio

A time required to print each recorded object obtained in the above recording test was measured. The recording medium at this time was set as A4 size. Then, a ratio (printing time ratio) of the printing time in each example, each comparative example, and each reference example to the printing time when recording is performed by the pre-printing method similar to the image quality evaluation was determined by the following evaluation criteria.

Evaluation Criteria

A: The printing time ratio is less than 80%.

B: The printing time ratio is 80% or more and less than 100%.

C: The printing time ratio is 100% or more.

3.3. Evaluation Results

The results of the evaluation test are shown in Tables 3 to 4 above.

From the above evaluation results, in each example, both excellent printing speed and excellent image quality could be achieved. On the other hand, the image quality was inferior in each comparative example. Each reference example was inferior at the printing speed. Details are described below.

From Examples 1 to 4, it was found that the specific abrasion resistance was more excellent as the adhesion amount ratio of the white ink composition decreased. It is presumed that this is because an organic solvent contained in the white ink composition is less likely to remain on the recording medium.

From Examples 2, 6, and 10, it was found that the image quality slightly deteriorated regardless of whether the adhesion amount ratio of the non-white ink composition was large or small.

From Examples 1 and 8, when the nitrogen-containing solvent was contained, the specific abrasion resistance was more excellent.

From Examples 2 and 9, when the nitrogen-containing solvent was 2-pyrrolidone, the image quality was more excellent.

From Examples 1 and 15, when the white ink composition did not contain glycerol, the composition was more excellent in specific abrasion resistance.

From Examples 17 to 20, when the content of 2-pyrrolidone in the white ink composition was small, the specific abrasion resistance tended to be more excellent.

From Examples 21 and 22, when the content of 2-pyrrolidone in the non-white ink composition was large, the specific abrasion resistance tended to be more excellent.

When the primary heating temperature was higher than that in Examples 1 and 26, the image quality was slightly inferior.

When a total amount of the organic solvent was larger than that of Examples 1 and 27, the image quality was slightly inferior.

From Examples 7 and 28, when the scanning method was unidirectional scanning and the white ink nozzle row was arranged ahead of the non-white ink nozzle row in the main scanning direction of the pass, the image quality was slightly excellent.

The following contents are derived from the above-described embodiment.

An aspect of the recording method is a recording method of performing recording on a recording medium, the recording method including a white ink adhesion step of adhering a white ink composition containing a white color material to the recording medium, and a non-white ink adhesion step of adhering a non-white ink composition containing a non-white color material to the recording medium, in which the white ink adhesion step and the non-white ink adhesion step are performed by relative scanning between a recording head and the recording medium, the white ink adhesion step and the non-white ink adhesion step are performed by the relative scanning that is same as each other on a same scanning region of the recording medium, and in the recording region to which the white ink composition and the non-white ink composition are adhered, an adhesion amount of the white ink composition is 60% by mass or less with respect to 100% by mass of an adhesion amount of the non-white ink composition per unit region.

In the aspect of the recording method, the recording head may be an ink jet head, and the white ink adhesion step and the non-white ink adhesion step may be performed by ejecting ink from the ink jet head.

In the aspect of the recording method, in a scanning region where the scanning in one time of scanning is performed, scanning in which the white ink adhesion step and the non-white ink adhesion step are performed by a same scanning on the same scanning region of the recording medium may be performed a plurality of times.

In the aspect of the recording method, in the recording region to which the white ink composition and the non-white ink composition are adhered, a maximum adhesion amount of the white ink composition may be 7 mg/inch$^2$ or less.

In the aspect of the recording method, a content of the white color material in the white ink composition may be 5% to 20% by mass, and a content of the non-white color material in the non-white ink composition may be 0.5% to 6% by mass.

In the aspect of the recording method, the white ink composition and the non-white ink composition each may be a water-based ink.

In the aspect of the recording method, the white ink composition and the non-white ink composition each may have an organic solvent content of 30% by mass or less.

In the aspect of the recording method, the white ink composition and the non-white ink composition each may contain an organic solvent having a standard boiling point of 150° C. to 280° C.

In the aspect of the recording method, the white ink composition and the non-white ink composition each may not contain a polyol organic solvent having a standard boiling point of more than 280° C. in an amount of more than 2% by mass.

In the aspect of the recording method, the white ink composition and the non-white ink composition each may not contain a nitrogen-containing solvent in an amount of more than 18% by mass with respect to a total content of 100% by mass of the organic solvent.

In the aspect of the recording method, a content of the nitrogen-containing solvent in the white ink composition may be smaller than a content of the nitrogen-containing solvent in the non-white ink composition.

In the aspect of the recording method, the recording medium may be a low-absorption recording medium or a non-absorption recording medium.

In the aspect of the recording method, the recording medium may be a non-white recording medium.

An aspect of the recording apparatus is a recording apparatus that performs recording on a recording medium, including a white ink head that adheres a white ink composition containing a white color material to the recording medium, a non-white ink head that adheres a non-white ink composition containing a non-white color material to the recording medium, and a scanning mechanism that performs relative scanning between an ink head and the recording medium, in which recording is performed by the recording method of the aspect.

The present disclosure is not limited to the above-described embodiment, and various modifications can be done. For example, the present disclosure includes a configuration substantially the same as the configuration described in the embodiment, for example, a configuration having the same function, method, and result, or a configuration having the same object and effect. The present disclosure also includes a configuration in which a non-essential part of the configuration described in the embodiment is replaced. In addition, the present disclosure includes a configuration that exhibits the same effects as the configuration described in the embodiment or a configuration that can achieve the same object. In addition, the present disclosure includes a configuration in which a known technique is added to the configuration described in the embodiment.

What is claimed is:

1. A recording method that performs recording on a recording medium, the recording method comprising:

a white ink adhesion step of adhering a white ink composition containing a white color material to the recording medium; and a non-white ink adhesion step of adhering a non-white ink composition containing a non-white color material to the recording medium, wherein the white ink adhesion step and the non-white ink adhesion step are performed by relative scanning between a recording head and the recording medium, the white ink adhesion step and the non-white ink adhesion step are performed by the relative scanning that is same as each other on a same scanning region of the recording medium, in a recording region to which the white ink composition and the non-white ink composition are adhered, an adhesion amount of the white ink composition is 60% by mass or less with respect to 100% by mass of an adhesion amount of the non-white ink composition per unit region, and in the recording region to which the white ink composition and the non-white ink composition are adhered, a maximum adhesion amount of the white ink composition is 1.5 mg/inch$^2$ or less, and the recording head includes a white ink nozzle row and a non-white ink nozzle row that each extend along a direction that intersects a scanning direction of the recording head, the white ink nozzle row has a white ink ejection nozzle row for ejecting the white ink composition at a time of recording, and the non-white ink nozzle row has a non-white ink ejection nozzle row for ejecting the non-white ink composition at the time of recording, when the white ink nozzle row and the non-white ink nozzle row are projected along the scanning direction, the white ink ejection nozzle row has a portion that overlaps the non-white ink ejection nozzle row in the direction that intersects the scanning direction of the recording head such that the white ink composition overlaps the non-white ink composition by a same scanning on a same scanning region of the recording medium, and the scanning is conducted by moving a carriage to which the ink jet head is mounted.

2. The recording method according to claim 1, wherein the recording head is an ink jet head, and the white ink adhesion step and the non-white ink adhesion step are performed by ejecting ink from the ink jet head.

3. The recording method according to claim 1, wherein in a scanning region where scanning in one time of scanning is performed, scanning in which the white ink adhesion step and the non-white ink adhesion step are performed by a same scanning on the same scanning region of the recording medium is performed a plurality of times.

4. The recording method according to claim 1, wherein in the recording region to which the white ink composition and the non-white ink composition are adhered, a maximum adhesion amount of the white ink composition 0.1 to 1.5 mg/inch$^2$.

5. The recording method according to claim 1, wherein a content of the white color material in the white ink composition is 5% to 20% by mass, and a content of the non-white color material in the non-white ink composition is 0.5% to 6% by mass.

6. The recording method according to claim 1, wherein each of the white ink composition and the non-white ink composition is a water-based ink.

7. The recording method according to claim 1, wherein each of the white ink composition and the non-white ink composition has an organic solvent content of 30% by mass or less.

8. The recording method according to claim 1, wherein each of the white ink composition and the non-white ink composition contains an organic solvent having a standard boiling point of 150° C. to 280° C.

9. The recording method according to claim 1, wherein each of the white ink composition and the non-white ink composition does not contain a polyol organic solvent having a standard boiling point of more than 280° C. in an amount of more than 2% by mass.

10. The recording method according to claim 1, wherein each of the white ink composition and the non-white ink composition does not contain a nitrogen-containing solvent in an amount of more than 18% by mass with respect to a total content of 100% by mass of an organic solvent.

11. The recording method according to claim 1, wherein a content of a nitrogen-containing solvent in the white ink composition is smaller than a content of a nitrogen-containing solvent in the non-white ink composition.

12. The recording method according to claim 1, wherein the recording medium is a low-absorption recording medium or a non-absorption recording medium.

13. The recording method according to claim 1, wherein the recording medium is a non-white recording medium.

14. A recording apparatus performing recording on a recording medium, the recording apparatus comprising:

a white ink head that adheres a white ink composition containing a white color material to the recording medium;

a non-white ink head that adheres a non-white ink composition containing a non-white color material to the recording medium; and a scanning mechanism that performs relative scanning between an ink head and the recording medium, wherein recording is performed by the recording method according to claim 1.

15. The recording method according to claim 1, wherein in the recording region to which the white ink composition and the non-white ink composition are adhered, a maximum adhesion amount of the non-white ink composition is 5 $mg/inch^2$ or more.

* * * * *